US010848398B2

(12) United States Patent
Rhee

(10) Patent No.: US 10,848,398 B2
(45) Date of Patent: Nov. 24, 2020

(54) METHOD, APPARATUS, AND SYSTEM FOR OPTIMIZING PERFORMANCE OF A COMMUNICATION UNIT BY A REMOTE SERVER

(75) Inventor: Wonjong Rhee, Seoul (KR)

(73) Assignee: ASSIA SPE, LLC, Wilmington, DE (US)

(*) Notice: Subject to any disclaimer, the term of this patent is extended or adjusted under 35 U.S.C. 154(b) by 0 days.

(21) Appl. No.: 14/356,581

(22) PCT Filed: Nov. 10, 2011

(86) PCT No.: PCT/US2011/060265
§ 371 (c)(1),
(2), (4) Date: May 6, 2014

(87) PCT Pub. No.: WO2013/070232
PCT Pub. Date: May 16, 2013

(65) Prior Publication Data
US 2014/0304408 A1    Oct. 9, 2014

(51) Int. Cl.
*H04L 1/00* (2006.01)
*H04L 1/20* (2006.01)
*H04L 12/26* (2006.01)

(52) U.S. Cl.
CPC ............ *H04L 43/04* (2013.01); *H04L 1/0019* (2013.01); *H04L 1/20* (2013.01)

(58) Field of Classification Search
CPC ......... H04L 7/00; H04L 7/0004; H04L 12/00; H04L 12/14; H04L 12/16; H04L 12/24;
(Continued)

(56) References Cited

U.S. PATENT DOCUMENTS 5,970,064 A * 10/1999 Clark .................. H04L 41/0813
370/242
5,974,106 A * 10/1999 Dupont ................ H04L 1/0002
375/377
(Continued)

FOREIGN PATENT DOCUMENTS

CN       101156458 A     4/2008
EP         2112781 A1    10/2009
(Continued)

OTHER PUBLICATIONS

Dietrich (Decision Making—Inquiries Journal—2010).*
(Continued)

*Primary Examiner* — Michael A Keller
*Assistant Examiner* — Boris D Grijalva Lobos
(74) *Attorney, Agent, or Firm* — North Weber and Baugh LLP; Michael North

(57) ABSTRACT

Described herein are apparatus, system, and method for optimizing performance of one or more communication units by a remote server. The method comprises: collecting data from the one or more communication units; generating a policy, for each of the one or more communication units, based on the collected data; and sending the policy to each of the one or more communication units, wherein the policy comprises conditions for operation of the one or more communication units, wherein the one or more communication units implement the policy according to time-varying data. The system comprises: one or more communication units; and a server operable to communicate with the one or more communication units, wherein the server comprises: a memory; and a processor, coupled to the memory, and operable to perform the method discussed above.

25 Claims, 6 Drawing Sheets

(58) Field of Classification Search
CPC ............ H04L 12/2414; H04L 12/2415; H04L 12/2417–2419; H04L 12/2424–2426; H04L 12/2428–2433; H04L 12/2439; H04L 12/244–2442; H04L 12/2447; H04L 12/2464; H04L 12/2465; H04L 12/2468–247; H04L 12/2472; H04L 12/2473; H04L 12/2476; H04L 12/2478; H04L 12/26; H04L 12/2602; H04L 12/2618; H04L 12/2634–2642; H04L 12/2668–2678; H04L 12/2692; H04L 41/00; H04L 41/06; H04L 41/08–0806; H04L 41/0813–0836; H04L 41/085–0859; H04L 41/0866–0869; H04L 41/50–5016; H04L 41/5035; H04L 41/5038; H04L 43/00; H04L 43/04; H04L 43/08–0817; H04L 43/0876–10; H04L 43/16; H04L 47/00; H04L 47/10; H04L 47/11; H04L 47/12; H04L 47/28; H04L 47/29; H04L 47/32; H04L 1/00; H04L 1/0019; H04L 1/20

See application file for complete search history.

(56) References Cited

U.S. PATENT DOCUMENTS

| | | |
|---|---|---|
| 6,430,612 B1 | 8/2002 | Iizuka |
| 6,469,982 B1 | 10/2002 | Henrion et al. |
| 6,618,356 B1 | 9/2003 | Bonaventure |
| 6,678,247 B1 | 1/2004 | Bonaventure |
| 6,680,907 B1 | 1/2004 | Bonaventure |
| 7,840,220 B1 | 11/2010 | Mitchell |
| 7,864,669 B2 | 1/2011 | Bonaventure et al. |
| 8,126,011 B2 | 2/2012 | Evans |
| 8,249,520 B2* | 8/2012 | Chuang ............... H04L 1/0003 375/346 |
| 8,355,316 B1* | 1/2013 | Lushear ............. H04L 43/0817 370/217 |
| 8,520,586 B1* | 8/2013 | Husted ................ H04W 74/08 370/318 |
| 8,880,666 B2* | 11/2014 | Aaron ................ H04L 67/1008 709/219 |
| 9,277,564 B2* | 3/2016 | Wang .................. H04W 72/04 |
| 9,313,752 B2* | 4/2016 | Czaja ................. H04W 52/343 |
| 9,819,595 B2 | 11/2017 | Cioffi et al. |
| 10,057,080 B2 | 8/2018 | Evans |
| 10,530,695 B2 | 1/2020 | Cioffi et al. |
| 2003/0031180 A1 | 2/2003 | Datta et al. |
| 2003/0076784 A1 | 4/2003 | Ta et al. |
| 2003/0198200 A1* | 10/2003 | Diener ................ H04L 1/1664 370/329 |
| 2004/0221296 A1* | 11/2004 | Ogielski ................ H04L 41/00 719/313 |
| 2005/0055466 A1 | 3/2005 | Matsuno et al. |
| 2005/0055579 A1* | 3/2005 | Kanda .................. H04L 63/20 726/4 |
| 2005/0114501 A1* | 5/2005 | Raden .................. H04L 43/14 709/224 |
| 2005/0132044 A1* | 6/2005 | Guingo ............... H04L 41/5009 709/225 |
| 2005/0261915 A1 | 11/2005 | Ooki et al. |
| 2006/0126613 A1 | 6/2006 | Zweig |
| 2006/0187885 A1* | 8/2006 | Roy ..................... H04L 1/0015 370/332 |
| 2007/0153807 A1 | 7/2007 | Cruz et al. |
| 2007/0180490 A1* | 8/2007 | Renzi .................. G06F 21/577 726/1 |
| 2008/0098454 A1* | 4/2008 | Toh .................... H04L 41/0622 726/1 |
| 2008/0159124 A1 | 7/2008 | Sasaki |
| 2008/0186873 A1 | 8/2008 | Pujet et al. |
| 2008/0219239 A1* | 9/2008 | Bell .................... H04L 12/4625 370/351 |
| 2009/0016358 A1 | 1/2009 | Lee |
| 2009/0055900 A1 | 2/2009 | Gopalasetty et al. |
| 2009/0075648 A1* | 3/2009 | Reed ................... H04L 41/0816 455/424 |
| 2009/0147697 A1 | 6/2009 | Malik et al. |
| 2009/0201805 A1 | 8/2009 | Begen et al. |
| 2009/0207730 A1* | 8/2009 | Stamoulis ......... H04W 72/1278 370/230.1 |
| 2009/0310528 A1 | 12/2009 | Tamura |
| 2010/0153377 A1* | 6/2010 | Rajan ................ G06F 16/24575 707/723 |
| 2010/0290465 A1 | 11/2010 | Ankaiah et al. |
| 2011/0002371 A1* | 1/2011 | Forenza ............... H04B 7/0417 375/227 |
| 2011/0013529 A1 | 1/2011 | Bin et al. |
| 2011/0110359 A1 | 5/2011 | Cooke et al. |
| 2011/0182182 A1 | 7/2011 | Yang et al. |
| 2011/0267951 A1* | 11/2011 | Stanwood ........... H04L 41/5022 370/235 |
| 2011/0273979 A1 | 11/2011 | Grabelsky et al. |
| 2011/0314145 A1* | 12/2011 | Raleigh .................. H04L 63/08 709/224 |
| 2012/0089664 A1* | 4/2012 | Igelka .................. G06F 9/5083 709/203 |
| 2012/0151540 A1* | 6/2012 | Stanwood .............. H04L 65/00 725/109 |
| 2012/0294310 A1 | 11/2012 | Yen et al. |
| 2013/0077482 A1 | 3/2013 | Krishna et al. |
| 2013/0122910 A1* | 5/2013 | Singh .................... H04W 36/18 455/437 |
| 2014/0304408 A1 | 10/2014 | Rhee |
| 2016/0261490 A1 | 9/2016 | Evans |
| 2016/0315976 A1 | 10/2016 | Detal et al. |
| 2018/0248984 A1 | 8/2018 | Bonaventure et al. |

FOREIGN PATENT DOCUMENTS

| | | |
|---|---|---|
| EP | 2426983 | 3/2012 |
| EP | 2426983 A1 | 3/2012 |
| EP | 1652363 B1 | 8/2012 |
| EP | 3151504 A1 | 4/2017 |
| EP | 3255845 A1 | 12/2017 |
| JP | 2001-168913 | 6/2001 |
| JP | 2002-64561 | 2/2002 |
| JP | 2002-111729 | 4/2002 |
| JP | 2003-110605 | 4/2003 |
| JP | 2004173170 | 6/2004 |
| JP | 2004173170 A | 6/2004 |
| JP | 2004-236030 | 8/2004 |
| JP | 2004-350198 | 12/2004 |
| JP | 2005-86628 | 3/2005 |
| JP | 201056898 | 11/2010 |
| WO | 2006091391 A2 | 8/2006 |
| WO | 2007116411 A1 | 10/2007 |
| WO | 2007136337 A2 | 11/2007 |
| WO | WO-2007136337 | 11/2007 |
| WO | WO-2008/072606 | 6/2008 |
| WO | 2011079612 | 7/2011 |
| WO | 2011079612 A1 | 7/2011 |
| WO | WO-2011079612 | 7/2011 |
| WO | 2013023989 A1 | 2/2013 |
| WO | 2013070232 A1 | 5/2013 |

OTHER PUBLICATIONS

OODA Loop—Wikipedia, the free encyclopedia—Feb. 2009.*
Measuring RSSI with Wifi Cards—TomatoUSB—2010.*
International Preliminary Report on Patentability for International Patent Application No. PCT/US2011/060265, dated May 22, 2014, 12 pages.
International Search Report and Written Opinion for International Patent Application No. PCT/US2011/060265, dated Jun. 21, 2012.
Office Action for Australian Patent Application No. 2011380909, dated Apr. 20, 2016.
Office Action dated Nov. 9, 2016, in Chinese Patent Application No. 201180075399.4 (4 pgs).

(56) References Cited

OTHER PUBLICATIONS

IETF 79 Proceedings, "Multipath TCP (pmtcp) (WG)," URL: https://www.ietf.org/proceedings/79/mptcp.html (3pgs).
Bagnulo, Marcelo, "MPTCP threats," MPTCP WG—IETF79, URL: https://www.ietf.org/proceedings/79/slides/mptcp-7/mptcp-7.htm (3pgs).
Yoshifumi, Nishida et al., "MPTCP—Multipath TCP," WG meeting #5, Nov. 8, 2010 and Nov. 10, 2010, Beijing, ietf-79, URL: https://www.ietf.org/proceedings/79/slides/mptcp-3/mptcp-3.htm (7pgs).
Ford, Alan, "MPTCP Protocol, draft-ietf-mptcp-multiaddressed-02, Update and Open Issues," IETF79—Beijing, URL: https://www.ietf.org/proceedings/79/slides/mptcp-2/mptcp-2.htm (11pgs).
Ford, Alan, "MPTCP API, draft-scharf-mptcp-api-03," IETF79—Beijing, URL: https://www.ietf.org/proceedings/79/slides/mptcp-1/mptcp-1.htm (6pgs).
Ford, Alan, "MPTCP Architecture, draft-ietf-mptcp-architecture-02," IETF79—Beijing, URL: https://www.ietf.org/proceedings/79/slides/mptcp-0/mptcp-0.htm (7pgs).
Raiciu, Costin et al., "Data Center Networking with Multipath TCP," URL: https://www.ietf.org/proceedings/79/slides/mptcp-6/mptcp-6.htm (28pgs).
Honda, Michio et al., "Midterm Reports of MPTCP-Related Middlebox Behavior," MPTCP WG, Nov. 10, 2010, 79th IETF@Beijing, URL: https://www.ietf.org/proceedings/79/slides/mptcp-5/mptcp-5.htm (13pgs).
Nishida, Yoshifumi et al., "MPTCP—Multipath TCP," WG meeting #5, Nov. 8, 2010 and Nov. 10, 2010, Beijing, ietf-79, URL: https://www.ietf.org/proceedings/79/slides/mptcp-4/mptcp-4.htm (5pgs).
78th IETF Meeting in Maastricht, Netherlands, Mar. 25, 2010, URL: https://www.ietf.org/proceedings/78/mptcp.htm (4pgs).
Eardley, Philip et al., "MPTCP—Multipath TCP," WG meeting #3, Jul. 27, 2010 and Jul. 29, 2010, Maastricht, ietf-78, URL: https://www.ietf.org/proceedings/78/slides/mptcp-0/mptcp-0.htm (8pgs).
Honda, Michio et al., Middlebox Investigation in the Internet for Designing TCP Extensions, Jul. 27, 2010, 78th IETF @ Maastricht, Netherlands, URL: https://www.ietf.org/proceedings/78/slides/mptcp-1.pdf (13pgs).
Scharf, Michael, Options vs. Payload Encoding: MCTCP's Perspective, draft-scharf-mptcp-mctcp-01, IETF78, Jul. 2010, URL: https://www.ietf.org/proceedings/78/slides/mptcp-2.pdf (9pgs).
Raiciu, Costin, IETF78, Maastricht, URL: https://www.ietf.org/proceedings/78/slides/mptcp-3/mptcp-3.htm (14pgs).
Eardley, Philip et al., "MPTCP—Multipath TCP," WG meeting #3, Jul. 27, 2010 and Jul. 29, 2010, Maastricht, ietf-78, URL: https://www.ietf.org/proceedings/78/slides/mptcp-9/mptcp-9.htm (15pgs).
"MPTCP threats," MPTCP WG IETF78—Maastricht, URL: https://www.ietf.org/proceedings/78/slides/mptcp-10.pdf (5pgs).
Ford, Alan, "MPTCP Architecture—Status Update, draft-ietf-mptcp-architecture-01," IETF78—Maastricht, URL: https://www.ietf.org/proceedings/78/slides/mptcp-6/mptcp-6.htm (3pgs).
Ford, Alan, "MPTCP Protocol—Status Update, draft-ietf-mptcp-multiaddressed-01," IETF78—Maastricht, URL: https://www.ietf.org/proceedings/78/slides/mptcp-5/mptcp-5.htm (6pgs).
Raiciu, Costin, "Update on Multipath Congestion Control," IETF78, Maastricht, URL: https://www.ietf.org/proceedings/78/slides/mptcp-8/mptcp-8.htm (3pgs).
Scharf, Michael et al., "MPTCP Application Considerations, draft-scharf-mptcp-api-02," IETF78, Jul. 2010, URL: https://www.ietf.org/proceedings/78/slides/mptcp-7.pdf (8pgs).
Nishida, Yoshifumi et al., Charter from 77th IETF Meeting in Anaheim, CA, Mar. 25, 2010, "2.8.6 Multipath TCP (mptcp)," URL: https://www.ietf.org/proceedings/77/mptcp.html (4pgs).
Ford Alan, "Multipath TCP Architecture (draft-ietf-mptcp-architecture-00)," URL: https://www.ietf.org/proceedings/77/slides/mptcp-0/mptcp-0_files/v3_document.htm (7pgs).
Ford, Alan, "Multipath TCP draft-ford-mptcp-multiaddressed-03," URL: https://www.ietf.org/proceedings/77/slides/mptcp-1/mptcp-1_files/v3_document.htm (6pgs).
Raiciu, Costin, "Multipath TCP Signaling Options or Payload?" URL: https://www.ietf.org/proceedings/77/slides/mptcp-4.pdf (19pgs).
Bagnulo, Marcelo, "MPTCP threat analysis: an update," IETF77—MPTCP WG, URL: https://www.ietf.org/proceedings/77/slides/mptcp-10/mptcp-10_files/v3_document.htm (23pgs).
Handley, Mark et al., "Coupled Congestion Control for MPTCP," URL: https://www.ietf.org/proceedings/77/slides/mptcp-9.pdf (16pgs).
Scharf, Michael et al., "MPTCP Application Considerations, draft-scharf-mptcp-api-01," IETF77, Mar. 2010, URL: https://www.ietf.org/proceedings/77/slides/mptcp-8/mptcp-8_files/v3_document.htm (13pgs).
"SICS, Name based sockets, apropos MPTCP API," Mar. 26, 2010A part of Swedish ICT, Mar. 26, 2010, IETF77, Anaheim, URL: https://www.ietf.org/proceedings/77/slides/mptcp-7.pdf (24pgs).
Nishida, Yoshifumi et al., Charter from 76th IETF Meeting in Hiroshima, Japan, Oct. 29, 2009, "2.8.8 Multipath TCP (mptcp)," URL: https://www.ietf.org/proceedings/76/mptcp.html (4pgs).
"MPTCP—Multipath TCP," WG meeting #1, Nov. 9, 2009, Hiroshima, Japan, ietf-76, URL: https://www.ietf.org/proceedings/76/slides/mptcp-7/mptcp-7.htm (11pgs).
"An Architectural Perspective on Multipath Transport, draft-ford-mptcp-architecture-00," URL: https://www.ietf.org/proceedings/76/slides/mptcp-5.pdf (15pgs).
Ford, Alan et al., "Multi-addressed Multipath TCP, draft-ford-mptcp-multiaddressed-02," URL: https://www.ietf.org/proceedings/76/slides/mptcp-3/mptcp-3.htm (22pgs).
Raiciu, Costin et al., "Linked Congestion Control," URL: https://www.ietf.org/proceedings/76/slides/mptcp-8.pdf (32pgs).
Bagnulo, Marcelo, "MPTCP Threat analysis, draft-bagnulo-mptcp-threat-00," IETF76—MPTCP WG, URL: https://www.ietf.org/proceedings/76/slides/mptcp-0/mptcp-0.htm (28pgs).
Scharf, Michael et al., "MPTCP Application Considerations, draft-scharf-mptcp-api-00.txt," Nov. 9, 2009, URL: https://www.ietf.org/proceedings/76/slides/mptcp-2/mptcp-2.htm (10pgs).
Handley, Mark, et al., "Routing of Outgoing Packets with MP-TCP, draft-handley-mptcp-routing-00," URL: https://www.ietf.org/proceedings/76/slides/mptcp-4/mptcp-4.htm (21pgs).
Nishida, Yoshifumi et al., Charter from 75th IETF Meeting in Stockholm, Sweden, Oct. 19, 2009, "2.8.5 Multipath TCP (mptcp)," URL: https://www.ietf.org/proceedings/75/mptcp.html (4pgs).
Handley, Mark, "Multipath TCP: Goals and Background," URL: https://www.ietf.org/proceedings/75/slides/mptcp-0.pdf (26pgs).
Ford, Alan, "Multipath TCP Protocol Design," URL: https://www.ietf.org/proceedings/75/slides/mptcp-2.pdf (16pgs).
Raiciu, Costin, "Linked Congestion Control," URL: https://www.ietf.org/proceedings/75/slides/mptcp-4.pdf (35pgs).
Iyengar, Janardhan et al., "An Architectural Perspective on MPTCP," Draft: http://tools.ietf.org/html/draft-iyengar-ford-tng-00, Presentation for MPTCP BoF at IETF75, Jul. 30, 2009, URL: https://www.ietf.org/proceedings/75/slides/mptcp-5.pdf (13pgs).
Handley, Mark et al., "Multipath TCP BOF," IETF-75, Stockholm, Sweden, Jul. 30, 2009, URL: https://www.ietf.org/proceedings/75/slides/mptcp-3/mptcp-3_files/v3_document.htm (6pgs).
Naresh, Kumar et al., "Security for 5G, draft-naresh-mptcp-security-for-5g-01.txt," Aug. 4, 2018, URL: https://tools.ietf.org/html/draft-naresh-mptcp-security-for-5g-01 (7pgs).
Shailendra, Samar et al., "Extended Socket APIs to control subflow priority in Multipath TCP, draft-samar-mptcp-socketapi-01.txt," Jul. 31, 2018, URL: https://tools.ietf.org/html/draft-samar-mptcp-socketapi-01 (7pgs).
De Foy, X. et al., "Considerations for MPTCP operation in 5G, draft-defoy-mptcp-considerations-for-5g-01," URL: https://tools.ietf.org/html/draft-defoy-mptcp-considerations-for-5g-01 (13pgs).
Song, F. et al., "One Way Latency Considerations for MPTCP, draft-song-mptcp-owl-04," URL: https://tools.ietf.org/html/draft-song-mptcp-owl-04 (11pgs).
Barre, S. et al., TFO support for Multipath TCP, draft-barre-mptcp-tfo-03, May 29, 2018, URL: https://tools.ietf.org/html/draft-barre-mptcp-tfo-03 (12pgs).
Ford, A. et al., "TCP Extensions for Multipath Operation with Multiple Addresses, draft-ietf-mptcp-rfc6824bis-11," May, 15, 2018, URL: https://tools.ietf.org/html/draft-ietf-mptcp-rfc6824bis-11 (76pgs).

(56) References Cited

OTHER PUBLICATIONS

Zuo, J. et al., "A Path-Aware Scheduling Scheme for Multipath Transport Protocols, draft-zuo-mptcp-scheduler-01.txt," Mar. 21, 2018, URL: https://tools.ietf.org/html/draft-zuo-mptcp-scheduler-01 (8pgs).
Hesmans, B. et al., "A socket API to control Multipath TCP, draft-hesmans-mptcp-socket-03," Mar. 5, 2018, URL: https://tools.ietf.org/html/draft-hesmans-mptcp-socket-03 (18pgs).
Non-Final Office Action for Japanese Patent Application No. 2014-541020, dated Apr. 22, 2015.
Notice of Allowance for European Patent Application No. 11787994.0, dated Apr. 24, 2015.
Examination Report dated Apr. 6, 2018, in Australian Patent Application No. 2017202588 (5pgs).
Wang, F. et al., "A Proactive Approach to Avoid Performance Degradation of MPTCP, draft-zuo-mptcp-degradation-00," Oct. 30, 2017, URL: https://tools.ietf.org/html/draft-zuo-mptcp-degradation-00 (9pgs).
Purkayastha, D. et al., "Considerations for MPTCP operation in 5G, draft-purkayastha-mptcp-considerations-for-nextgen-00," Oct. 29, 2017, URL: https://tools.ietf.org/html/draft-purkayastha-mptcp-considerations-for-nextgen-00 (7pgs).
Bonaventure, O. et al., "O-RTT TCP Converter, draft-bonaventure-mptcp-converters-02," Oct. 30, 2017, URL: https://tools.ietf.org/html/draft-bonaventure-mptcp-converters-02 (32pgs).
Boucadair, M. et al., "RADIUS Extensions for Network-assisted Multipath TCP (MPTCP), draft-boucadair-mptcp-radius-05," Oct. 8, 2017, URL: https://tools.ietf.org/html/draft-boucadair-mptcp-radius-05 (11pgs).
Boucadair, M. et al., "DHCP Options for Network-Assisted Multipath TCP (MPTCP), draft-boucadair-mptcp-dhc-08," Oct. 8, 2017, URL: https://tools.ietf.org/html/draft-boucadair-mptcp-dhc-08 (13pgs).
Duchene, F. et al., "Multipath TCP Load Balancing, draft-duchene-mptcp-load-balancing-01," Jul. 3, 2017, URL: https://tools.ietf.org/html/draft-duchene-mptcp-load-balancing-01 (12pgs).
Xu, Changqiao et al., "A Message-Oriented Extension to Multipath Transmission Control Protocol (MPTCP), draft-xu-mptcp-momp-04.txt," Jun. 21, 2017, URL: https://tools.ietf.org/html/draft-xu-mptcp-momp-04 (14pgs).
Xu, Changqiao et al., "Multipath Transmission Control Protocol (MPTCP) Partial Reliability Extension, draft-xu-mptcp-prmp-04.txt," Jun. 20, 2017, URL: https://tools.ietf.org/html/draft-xu-mptcp-prmp-04 (12pgs).
Leymann, N. et al., "Integration of Bonding Tunnels and MPTCP, draft-zuo-banana-mptcp-integration-00.txt," URL: https://tools.ietf.org/html/draft-zuo-banana-mptcp-integration-00 (12pgs).
Dreibholz, T. et al., "MPTCP Experiences in the NorNet Testbed, draft-dreibholz-mptcp-nornet-experience-04.txt," Mar. 30, 2017, URL: https://tools.ietf.org/html/draft-dreibholz-mptcp-nornet-experience-04 (11pgs).
Boucadair, M. et al., "Extensions for Network-Assisted MPTCP Deployment Models, draft-boucadair-mptcp-plain-mode-10," Mar. 9, 2017, URL: https://tools.ietf.org/html/draft-boucadair-mptcp-plain-mode-10 (25pgs).
Xu, Mingwei et al., "Delay-based Congestion Control for MPTCP, draft-xu-mptcp-congestion-control-05.txt," Jan. 1, 2017, URL: https://tools.ietf.org/html/draft-xu-mptcp-congestion-control-05 (12pgs).
Boucadair, M. et al., "Network-Assisted MPTCP: Use Cases, Deployment Scenarios and Operational Considerations, draft-nam-mptcp-deployment-considerations-01," Dec. 7, 2016, URL: https://tools.ietf.org/html/draft-nam-mptcp-deployment-considerations-01 (29pgs).
Boucadair, M., "Negotiating the Maximum Number of Multipath TCP (MPTCP) Subflows, draft-boucadair-mptcp-max-subflow-03," Nov. 24, 2016, URL: https://tools.ietf.org/html/draft-boucadair-mptcp-max-subflow-03 (5pgs).
Nguyen, K. et al., "An Improvement of MPTCP Initialization, draft-kien-mptcp-init-00," Oct. 30, 2016, URL: https://tools.ietf.org/html/draft-kien-mptcp-init-00 (5pgs).
Bonaventure, O. et al., "Use Cases and Operational Experience with Multipath TCP, draft-ietf-mptcp-experience-07," Oct. 27, 2016, URL: https://tools.ietf.org/html/draft-ietf-mptcp-experience-07 (36pgs).
Kim, D., "Efficient Design for Secure Multipath TCP against Eavesdropper in Initial Handshake, draft-kim-mptcp-semptcp-00," Oct. 24, 2016, URL: https://tools.ietf.org/html/draft-kim-mptcp-semptcp-00 (16pgs).
Olteanu, V. et al., "Layer 4 Loadbalancing for MPTCP, draft-olteanu-mptcp-loadbalance-00," Jul. 8, 2016, URL: https://tools.ietf.org/html/draft-olteanu-mptcp-loadbalance-00 (7pgs).
Duchene, F. et al., "Multipath TCP Address Advertisement, draft-duchene-mptcp-add-addr-00," Jul. 8, 2016, URL: https://tools.ietf.org/html/draft-duchene-mptcp-add-addr-00 (13pgs).
Peirens, B. et al., "Link bonding with transparent Multipath TCP, draft-peirens-mptcp-transparent-00," Jul. 5, 2016, URL: https://tools.ietf.org/html/draft-peirens-mptcp-transparent-00 (21pgs).
Barik, R. et al., "A Linked Slow-Start Algorithm for MPTCP, draft-barik-mptcp-lisa-01," Jun. 27, 2016, URL: https://tools.ietf.org/html/draft-barik-mptcp-lisa-01 (8pgs).
Paasch, C. et al., "TLS Authentication for MPTCP, draft-paasch-mptcp-tls-authentication-00," May 27, 2016, URL: https://tools.ietf.org/html/draft-paasch-mptcp-tls-authentication-00 (5pgs).
Paasch, C. et al., "Application Layer Authentication for MPTCP, draft-paasch-mptcp-application-authentication-00," May 27, 2016, URL: https://tools.ietf.org/html/draft-paasch-mptcp-application-authentication-00 (8pgs).
Winter, R. et al., "Multipath TCP Support for Single-homed End-systems, draft-wr-mptcp-single-homed-07," Mar. 21, 2016, URL: https://tools.ietf.org/html/draft-wr-mptcp-single-homed-07 ( 8pgs).
Walid, A. et al., "Balanced Linked Adaptation Congestion Control Algorithm for MPTCP, draft-walid-mptcp-congestion-control-04," Jan. 23, 2016, URL: https://tools.ietf.org/html/draft-walid-mptcp-congestion-control-04 (11pgs).
Duchene, F. et al., "Multipath TCP MIB, draft-duchene-mptcp-mib-00," Oct. 19, 2015, URL: https://tools.ietf.org/html/draft-duchene-mptcp-mib-00 (10pgs).
Palanivelan, A. et al., "MPTCP Enhancement Opportunities, draft-palanivelanchetansenthil-mptcp-enhancements-00," Oct. 17, 2015, URL: https://tools.ietf.org/html/draft-palanivelanchetansenthil-mptcp-enhancements-00 (8pgs).
Paasch, C. et al., "Making Multipath TCP robust for stateless webservers, draft-paasch-mptcp-syncookies-02," Oct. 14, 2015, URL: https://tools.ietf.org/html/draft-paasch-mptcp-syncookies-02 (13pgs).
Paasch, C. et al., "Multipath TCP behind Layer-4 loadbalancers, draft-paasch-mptcp-loadbalancer-00," Sep. 7, 2015, URL: https://tools.ietf.org/html/draft-paasch-mptcp-loadbalancer-00 (8pgs).
Bonaventure, O., "Supporting long TCP options in Multipath TCP, draft-bonaventure-mptcp-long-options-00," Jul. 6, 2015, URL: https://tools.ietf.org/html/draft-bonaventure-mptcp-long-options-00 (20pgs).
Boucadair, M. et al., "Probing MPTCP Subflows, draft-boucadair-mptcp-probe-subflow-00," Jul. 6, 2015, URL: https://tools.ietf.org/html/draft-boucadair-mptcp-probe-subflow-00 (7pgs).
Bonaventure, O. et al., "Improving Multipath TCP Backup Subflows, draft-bonaventure-mptcp-backup-00," Jul. 6, 2015, URL: https://tools.ietf.org/html/draft-bonaventure-mptcp-backup-00 (11pgs).
Bonaventure, O. et al., "Multipath TCP Address Advertisement, draft-bonaventure-mptcp-addr-00," Jul. 6, 2015, URL: https://tools.ietf.org/html/draft-bonaventure-mptcp-addr-00 (9pgs).
Boucadair, M. et al., "An MPTCP Profile for NAT- and Firewall-Free Networks: Network-Assisted MPTCP Deployments, draft-boucadair-mptcp-natfwfree-profile-00," Jul. 3, 2015, URL: https://tools.ietf.org/html/draft-boucadair-mptcp-natfwfree-profile-00 (11pgs).
Bonaventure, O. et al., "Multipath TCP timestamp option, draft-bonaventure-mptcp-timestamp-01," Jul. 2, 2015, URL: https://tools.ietf.org/html/draft-bonaventure-mptcp-timestamp-01 (6pgs).
Wei, X et al., "MPTCP proxy mechanisms, draft-wei-mptcp-proxy-mechanism-02," Jul. 1, 2015, URL: https://tools.ietf.org/html/draft-wei-mptcp-proxy-mechanism-02 (11pgs).
Palanivelan, A. et al., "MPTCP Implementation (Challenges) Usecases, draft-palanivelanchetan-mptcp-challenges-usecases-00," Jun. 29, 2015, URL: https://tools.ietf.org/html/draft-palanivelanchetan-mptcp-challenges-usecases-00 (5pgs).

(56) References Cited

OTHER PUBLICATIONS

Boucadair, M. et al., "Negotiating the Maximum Number of MPTCP Subflows, draft-boucadair-mptcp-extensions-00," Jun. 16, 2015, URL: https://tools.ietf.org/html/draft-boucadair-mptcp-extensions-00 (5pgs).
Bonaventure, O. et al., "Experimental Multipath TCP option, draft-bonaventure-mptcp-exp-option-00," Jun. 16, 2015, URL: https://tools.ietf.org/html/draft-bonaventure-mptcp-exp-option-00 (8pgs).
Krupakaran, Kesava et al., "Optimized Multipath TCP subflows using Traceflow, draft-aravind-mptcp-optimized-subflows-00," Apr. 7, 2015, URL: https://tools.ietf.org/html/draft-aravind-mptcp-optimized-subflows-00 (10pgs).
Bagnulo, M. et al., "Analysis of MPTCP residual threats and possible fixes, draft-ietf-mptcp-attacks-04," Mar. 27, 2015, URL: https://tools.ietf.org/html/draft-ietf-mptcp-attacks-04 (18pgs).
Boucadair, M. et al., "An Extension to MPTCP for Symmetrical Sub-Flow Management, draft-boucadair-mptcp-symmetric-02," Mar. 9, 2015, URL: https://tools.ietf.org/html/draft-boucadair-mptcp-symmetric-02 (7pgs).
Boucadair, M. et al., "MPTCP Connectivity Checks, draft-boucadair-mptcp-connectivity-checks-00," Mar. 4, 2015, URL: https://tools.ietf.org/html/draft-boucadair-mptcp-connectivity-checks-00 (9pgs).
Lopez, E. et al., "Multipath TCP Middlebox Behavior, draft-lopez-mptcp-middlebox-00," Nov. 11, 2014, URL: https://tools.ietf.org/html/draft-lopez-mptcp-middlebox-00 (8pgs).
Bonaventure, O. et al., "MPTLS : Making TLS and Multipath TCP stronger together, draft-bonaventure-mptcp-tls-00," Oct. 27, 2014, URL: https://tools.ietf.org/html/draft-bonaventure-mptcp-tls-00 (21pgs).
Deng, L. et al., "Use-cases and Requirements for MPTCP Proxy in ISP Networks, draft-deng-mptcp-proxy-01," Oct. 24, 2014, URL: https://tools.ietf.org/html/draft-deng-mptcp-proxy-01 (18pgs).
Khalili, Ramin et al., "Opportunistic Linked-Increases Congestion Control Algorithm for MPTCP, draft-khalili-mptcp-congestion-control-05," Jul. 4, 2014, URL: https://tools.ietf.org/html/draft-khalili-mptcp-congestion-control-05 (11pgs).
Khalili, Ramin et al., "Performance Issues with MPTCP, draft-khalili-mptcp-performance-issues-06," Jul. 4, 2014, URL: https://tools.ietf.org/html/draft-khalili-mptcp-performance-issues-06 (17pgs).
Bonaventure, O. et al., "Processing of RST segments by Multipath TCP, draft-bonaventure-mptcp-rst-00," Jul. 3, 2014, URL: https://tools.ietf.org/html/draft-bonaventure-mptcp-rst-00 (12pgs).
Bonaventure, O. et al., "Experience with Multipath TCP, draft-bonaventure-mptcp-experience-00," Jul. 1, 2014, URL: https://tools.ietf.org/html/draft-bonaventure-mptcp-experience-00 (19pgs).
Handley, M. et al., "Outgoing Packet Routing with MP-TCP, draft-handley-mptcp-routing-00.txt," Oct. 19, 2009 (14pgs).
Sarolahti, P., "Multi-address Interface in the Socket API, draft-sarolahti-mptcp-af-multipath-01.txt," Mar. 4, 2010 (13pgs).
Scharf, M., "Multi-Connection TCP (MCTCP) Transport, draft-scharf-mptcp-mctcp-01," Jul. 12, 2010 (35pgs).
Singh, A. et al., "PayLoad Multi-connection Transport using Multiple Addresses, draft-singh-mptcp-plmt-00.txt," Aug. 6, 2010 (33pgs).
Barre, S. et al., "MultiPath TCP—Guidelines for implementers, draft-barre-mptcp-impl-00," Mar. 7, 2011 (42pgs).
Hampel, G. et al., "Enhancements to Improve the Applicability of Multipath TCP to Wireless Access Networks, draft-hampel-mptcp-applicability-wireless-networks-00," Jun. 15, 2011 (25pgs).
Bagnulo, M., "Threat Analysis for TCP Extensions for Multipath Operation with Multiple Addresses," Mar. 2011, RFC: 6181, ISSN: 2070-1721, MPTCP Threat Analysis (17pgs).
Ford, A. et al., "Architectural Guidelines for Multipath TCP Development," Mar. 2011, RFC: 6182, ISSN: 2070-1721, MPTCP Architecture (28pgs).
Raiciu, C. et al., "Coupled Congestion Control for Multipath Transport Protocols," Oct. 2011, RFC: 6356, ISSN: 2070-1721, MPTCP Congestion Control (12pgs).
Ford, A. et al., "TCP Extensions for Multipath Operation with Multiple Addresses, draft-ietf-mptcp-multiaddressed-04," Jul. 11, 2011, Internet-Draft, Multipath TCP (59pgs).
Ford, A. et al., "TCP Extensions for Multipath Operation with Multiple Addresses," Jan. 2013, RFC 6824, Multipath TCP (64pgs).
Scharf, M. et al., "MPTCP Application Interface Considerations, draft-ietf-mptcp-api-03," Nov. 30, 2011, Internet-Draft, MPTCP API (28pgs).
Scharf, M. et al., "Multipath TCP (MPTCP) Application Interface Considerations," Mar. 2013, RFC 6897, MPTCP API (31pgs).
Bagnulo, M. et al, "Analysis of Residual Threats and Possible Fixes for Multipath TCP (MPTCP)," Jul. 2015 RFC 7430, MPTCP Residual Threats (19pgs).
Bonaventure, O. et al., "Use Cases and Operational Experience with Multipath TCP," Jan. 2017 RFC 8041, MPTCP Experience (30pgs).
Stewart, R. et al., "Stream Control Transmission Protocol (SCTP) Dynamic Address Reconfiguration," Sep. 2007, RFC 5061, SCTP Dynamic Address Reconfiguration (41pgs).
Kumar, N. et al., "Security for 5G, draft-naresh-mptcp-security-for-5g-01.txt," Aug. 4, 2018, Internet-Draft (7pgs).
Shailendra, S. et al., "Extended Socket APIs to control subflow priority in Multipath TCP, draft-samar-mptcp-socketapi-01.txt," Jul. 31, 2018, MPTCP Working Group, Internet-Draft (8pgs).
De Foy, X. et al., "Considerations for MPTCP operation in 5G, draft-defoy-mptcp-considerations-for-5g-01," Jun. 22, 2018, Internet-Draft (14pgs).
Song, F. et al., "One Way Latency Considerations for MPTCP, draft-song-mptcp-owl-04, Jun. 16, 2018," Internet-Draft (11pgs).
Barre, S. et al., "TFO support for Multipath TCP, draft-barre-mptcp-tfo-03, May 29, 2018," Internet-Draft (13pgs).
Ford, A. et al., "TCP Extensions for Multipath Operation with Multiple Addresses, draft-ietf-mptcp-rfc6824bis-11," May 15, 2018, Internet-Draft (77pgs).
Zuo, J. et al., "A Path-Aware Scheduling Scheme for Multipath Transport Protocols, draft-zuo-mptcp-scheduler-01.txt," Mar. 21, 2018, Internet-Draft (9pgs).
Hesmans, B. et al., "A socket API to control Multipath TCP, draft-hesmans-mptcp-socket-03, Mar. 5, 2018," Internet-Draft (19pgs).
Wang, F. et al., "A Proactive Approach to Avoid Performance Degradation of MPTCP, draft-zuo-mptcp-degredation-00," Oct. 30, 2017, Internet-Draft (9pgs).
Purkayastha, D. et al., "Considerations for MPTCP operation in 5G, draft-purkayastha-mptcp-considerations-for-nextgen-00," Oct. 29, 2017 (4pgs).
C. Raiciu et al., "Coupled Congestion Control for Multipath Transport Protocols," draft-ietf-mptcp-congestion-02, Mar. 14, 2011 (13pgs).
C. Raiciu et al., "Coupled Congestion Control for Multipath Transport Protocols, draft-ietf-mptcp-congestion-01," Jan. 7, 2011 (13pgs).
C. Raiciu et al., "Coupled Multipath-Aware Congestion Control, draft-ietf-mptcp-congestion-00," Jul. 6, 2010 (12pgs).
M. Scharf et al., "MPTCP Application Interface Considerations, draft-ietf-mptcp-api-03," Nov. 30, 2011 (28pgs).
A. Ford et al., "TCP Extensions for Multipath Operation with Multiple Addresses," ISSN: 2070-1721 (65pgs).
A. Ford et al., "TCP Extensions for Multipath Operation with Multiple Addresses, draft-ietf-mptcp-multiaddressed-12," Apr. 25, 2013 (64pgs).
MPTCP Recent articles and software, "Experimenting with MPTCP using raw sockets (2018/04/18/mobil_tracebox.html)," Apr. 18, 2018 (19pgs).
A. Ford et al., "Architectural Guidelines for Multipath TCP Development, draft-ietf-mptcp-architecture-00," Feb. 28, 2010 (26pgs).
C. Raiciu et al., "Coupled Congestion Control for Multipath Transport Protocols," ISSN: 2070-1721, Oct. 2011 (12pgs).
C. Raiciu et al., "Coupled Congestion Control for Multipath Transport Protocols," ISSN: 2070-1721, Oct. 2011 (13pgs).
C. Raiciu et al., "Coupled Congestion Control for Multipath Transport Protocols, draft-ietf-mptcp-congestion-07," Jul. 29, 2011 (14pgs).
C. Raiciu et al., "Coupled Congestion Control for Multipath Transport Protocols, draft-ietf-mptcp-congestion-06," Jul. 25, 2011 (13pgs).
C. Raiciu et al., "Coupled Congestion Control for Multipath Transport Protocols, draft-ietf-mptcp-congestion-05," Jun. 16, 2011 (13pgs).
C. Raiciu et al., "Coupled Congestion Control for Multipath Transport Protocols, draft-ietf-mptcp-congestion-04," Jun. 15, 2011 (13pgs).
C. Raiciu et al., "Coupled Congestion Control for Multipath Transport Protocols, draft-ietf-mptcp-congestion-03," Apr. 11, 2011 (13pgs).

(56) References Cited

OTHER PUBLICATIONS

A. Ford et al., "Architectural Guidelines for Multipath TCP Development, draft-ietf-mptcp-architecture-01," Jun. 22, 2010 (28pgs).
Bagnulo, M., "Threat Analysis for TCP Extensions for Multi-path Operation with Multiple Addresses, draft-ieft-mptcp-threat-08," Jan. 26, 2011, URL: https://tools.ietf.org/html/draft-ietf-mptcp-threat-08 (17pgs).
Bagnulo, M., "Threat Analysis for TCP Extensions for Multi-path Operation with Multiple Addresses draft-ietf-mptcp-threat-07," Jan. 11, 2011, URL: https://tools.ietf.org/html/draft-ietf-mptcp-threat-07 (17pgs).
Bagnulo, M., "Threat Analysis for Multi-addressed/Multi-path TCP, draft-ietf-mptcp-threat-06," Dec. 7, 2010, URL: https://tools.ietf.org/html/draft-ietf-mptcp-threat-06 (17pgs).
Bagnulo, M., "Threat Analysis for Multi-addressed/Multi-path TCP, draft-ietf-mptcp-threat-05," Dec. 6, 2010, URL: https://tools.ietf.org/html/draft-ietf-mptcp-threat-05 (17pgs).
Bagnulo, M., "Threat Analysis for Multi-addressed/Multi-path TCP, draft-ietf-mptcp-threat-04," Nov. 26, 2010, URL: https://tools.ietf.org/html/draft-ietf-mptcp-threat-04 (16pgs).
Bagnulo, M., "Threat Analysis for Multi-addressed/Multi-path TCP, draft-ietf-mptcp-threat-03," Oct. 4, 2010, URL: https://tools.ietf.org/html/draft-ietf-mptcp-threat-03 (16pgs).
Bagnulo, M., "Threat Analysis for Multi-addressed/Multi-path TCP, draft-ietf-mptcp-threat-02," Mar. 29, 2010, URL: https://tools.ietf.org/html/draft-ietf-mptcp-threat-02 (15pgs).
Bagnulo, M., "Threat Analysis for Multi-addressed/Multi-path TCP, draft-ietf-mptcp-threat-01," Mar. 8, 2010, URL: https://tools.ietf.org/html/draft-ietf-mptcp-threat-01 (15pgs).
Deng, L. et al., "MPTCP Proxy for Mobile Networks, draft-deng-mptcp-mobile-network-proxy-00," Feb. 14, 2014, URL: https://tools.ietf.org/html/draft-deng-mptcp-mobile-network-proxy-00 (8pgs).
Bagnulo, M., "Secure MPTCP, draft-bagnulo-mptcp-secure-00," Feb. 12, 2014, URL: https://tools.ietf.org/html/draft-bagnulo-mptcp-secure-00 (8pgs).
Paasch, C. et al., "A generic control stream for Multipath TCP, draft-paasch-mptcp-control-stream-00," Feb. 11, 2014, URL: https://tools.ietf.org/html/draft-paasch-mptcp-control-stream-00 (11pgs).
Deng, Zhenjie, "Non-Renegable Selective Acknowledgements (NR-SACKs) for MPTCP, draft-deng-mptcp-nrsack-00.txt," Dec. 2, 2013, URL: https://tools.ietf.org/html/draft-deng-mptcp-nrsack-00 (10pgs).
Wing, D. et al., "Multipath TCP (MPTCP) Path Selection using PCP, draft-wing-mptcp-pcp-00," Oct. 7, 2013, URL: https://tools.ietf.org/html/draft-wing-mptcp-pcp-00 (10pgs).
Bagnulo, M. et al., "Analysis of MPTCP residual threats and possible fixes, draft-bagnulo-mptcp-attacks-01," Oct. 1, 2013, URL: https://tools.ietf.org/html/draft-bagnulo-mptcp-attacks-01 (25pgs).
Coene, Y. et al., "Conformance tests for Multipath TCP, draft-coene-mptcp-conformance-00," Jul. 15, 2013, URL: https://tools.ietf.org/html/draft-coene-mptcp-conformance-00 (10pgs).
Eardley, P., "Survey of MPTCP Implementations, draft-eardley-mptcp-implementations-survey-02," Jul. 12, 2013, URL: https://tools.ietf.org/html/draft-eardley-mptcp-implementations-survey-02 (38pgs).
Xue, K. et al., "TMPP for Both Two MPTCP-unaware Hosts, draft-xue-mptcp-tmpp-unware-hosts-02,"Jun. 20, 2013, URL: https://tools.ietf.org/html/draft-xue-mptcp-tmpp-unware-hosts-02 (15pgs).
Scharf, M. et al., "MPTCP Application Interface Considerations, draft-ietf-mptcp-api-07," Jan. 19, 2013, URL: https://tools.ietf.org/html/draft-ietf-mptcp-api-07 (34pgs).
Ford, A. et al., "TCP Extensions for Multipath Operation with Multiple Addresses, draft-ietf-mptcp-multiaddressed-12," Oct. 22, 2012, URL: https://tools.ietf.org/html/draft-ietf-mptcp-multiaddressed-12 (63pgs).
Paasch, C., Ed. et al., "Securing the MultiPath TCP handshake with external keys, draft-paasch-mptcp-ssl-00," Oct. 15, 2012, URL: https://tools.ietf.org/html/draft-paasch-mptcp-ssl-00 (8pgs).
Paasch, C., Ed. et al., "MultiPath TCP Low Overhead, draft-paasch-mptcp-lowoverhead-00," Oct. 15, 2012, URL: https://tools.ietf.org/html/draft-paasch-mptcp-lowoverhead-00 (9pgs).

Hampel, G. et al., "MPTCP Proxies and Anchors, draft-hampel-mptcp-proxies-anchors-00," Feb. 8, 2012, URL: https://tools.ietf.org/html/draft-hampel-mptcp-proxies-anchors-00 (30pgs).
Raiciu, C. et al., "Coupled Congestion Control for Multipath Transport Protocols, draft-ietf-mptcp-congestion-07," Jul. 29, 2011, URL: https://tools.ietf.org/html/draft-ietf-mptcp-congestion-07 (13pgs).
Hampel, G. et al., "Enhancements to Improve the Applicability of Multipath TCP to Wireless Access Networks, draft-hampel-mptcp-applicability-wireless-networks-00," Jun. 15, 2011, URL: https://tools.ietf.org/html/draft-hampel-mptcp-applicability-wireless-networks-00 (25pgs).
Barre, S. et al., "MultiPath TCP—Guidelines for implementers, draft-barre-mptcp-impl-00," Mar. 7, 2011, URL: https://tools.ietf.org/html/draft-barre-mptcp-impl-00 (41pgs).
Bagnulo, M., "Threat Analysis for TCP Extensions for Multi-path Operation with Multiple Addresses, draft-ietf-mptcp-threat-08," Jan. 26, 2011, URL: https://tools.ietf.org/html/draft-ietf-mptcp-threat-08 (17pgs).
Ford, A. et al., "Architectural Guidelines for Multipath TCP Development, draft-ietf-mptcp-architecture-05," Jan. 21, 2011, URL: https://tools.ietf.org/html/draft-ietf-mptcp-architecture-05 (29pgs).
Scharf, M. et al., "MPTCP Application Interface Considerations, draft-scharf-mptcp-api-04," Nov. 22, 2010, URL: https://tools.ietf.org/html/draft-scharf-mptcp-api-04 (26pgs).
Singh, A. et al., "PayLoad Multi-connection Transport using Multiple Addresses, draft-singh-mptcp-plmt-00.txt," Aug. 6, 2010, URL: https://tools.ietf.org/html/draft-singh-mptcp-plmt-00 (33pgs).
Scharf, M., "Multi-Connection TCP (MCTCP) Transport, draft-scharf-mptcp-mctcp-01," Jul. 12, 2010, URL: https://tools.ietf.org/html/draft-scharf-mptcp-mctcp-01 (35pgs).
Ford, A. et al., "TCP Extensions for Multipath Operation with Multiple Addresses, draft-ford-mptcp-multiaddressed-03," Mar. 8, 2010, URL: https://tools.ietf.org/html/draft-ford-mptcp-multiaddressed-03 (35pgs).
Raiciu, C. et al., "Coupled Multipath-Aware Congestion Control, draft-raiciu-mptcp-congestion-01," Mar. 8, 2010, URL: https://tools.ietf.org/html/draft-raiciu-mptcp-congestion-01 (11pgs).
Sarolahti, P., "Multi-address Interface in the Socket API, draft-sarolahti-mptcp-af-multipath-01.txt," Mar. 4, 2010, URL: https://tools.ietf.org/html/draft-sarolahti-mptcp-af-multipath-01 (13pgs).
Bagnulo, M., "Threat Analysis for Multi-addressed/Multi-path TCP, draft-bagnulo-mptcp-threat-01," Feb. 8, 2010, URL: https://tools.ietf.org/html/draft-bagnulo-mptcp-threat-01 (13pgs).
Ford, A., Ed. et al., "Architectural Guidelines for Multipath TCP Development, draft-ford-mptcp-architecture-01," Feb. 3, 2010, URL: https://tools.ietf.org/html/draft-ford-mptcp-architecture-01 (24pgs).
Handley, M., et al., "Outgoing Packet Routing with MP-TCP, draft-handley-mptcp-routing-00.txt," Oct. 19, 2009, URL: https://tools.ietf.org/html/draft-handley-mptcp-routing-00 (14pgs).
Office Action dated Aug. 10, 2018, in Canadian Patent Application No. 2,855,461 (3pgs).
Bagnulo, M., "Threat Analysis for Multi-addressed/Multi-path TCP, draft-ietf-mptcp-threat-00," Feb. 18, 2010, URL: https://tools.ietf.org/html/draft-ietf-mptcp-threat-00 (13pgs).
Ford, A. et al., "Architectural Guidelines for Multipath TCP Development, draft-ietf-mptcp-architecture-04," Jan. 11, 2011, URL: https://tools.ietf.org/html/draft-ietf-mptcp-architecture-04 (28pgs).
Ford, A. et al., "Architectural Guidelines for Multipath TCP Development, draft-ietf-mptcp-architecture-03," Dec. 8, 2010, URL: https://tools.ietf.org/html/draft-ietf-mptcp-architecture-03 (27pgs).
Ford, A. et al., "Architectural Guidelines for Multipath TCP Development, draft-ietf-mptcp-architecture-02," Oct. 16, 2010, URL: https://tools.ietf.org/html/draft-ietf-mptcp-architecture-02 (25pgs).
Ford, A. et al., "Architectural Guidelines for Multipath TCP Development, draft-ietf-mptcp-architecture-01," Jun. 22, 2010, URL: https://tools.ietf.org/html/draft-ietf-mptcp-architecture-01 (27pgs).
Ford, A. et al., "Architectural Guidelines for Multipath TCP Development, draft-ietf-mptcp-architecture-00," Feb. 28, 2010, URL: https://tools.ietf.org/html/draft-ietf-mptcp-architecture-00 (25pgs).
Raiciu, C. et al., "Coupled Congestion Control for Multipath Transport Protocols, draft-ietf-mptcp-congestion-06," Jul. 25, 2011, URL: https://tools.ietf.org/html/draft-ietf-mptcp-congestion-06 (12pgs).

(56) References Cited

OTHER PUBLICATIONS

Raiciu, C. et al., "Coupled Congestion Control for Multipath Transport Protocols, draft-ietf-mptcp-congestion-05," Jun. 16, 2011, URL: https://tools.ietf.org/html/draft-ietf-mptcp-congestion-05 (12pgs).
Raiciu, C. et al., "Coupled Congestion Control for Multipath Transport Protocols, draft-ietf-mptcp-congestion-04," Jun. 15, 2011, URL: https://tools.ietf.org/html/draft-ietf-mptcp-congestion-04 (12pgs).
Raiciu, C. et al., "Coupled Congestion Control for Multipath Transport Protocols, draft-ietf-mptcp-congestion-03," Apr. 11, 2011, URL: https://tools.ietf.org/html/draft-ietf-mptcp-congestion-03 (12pgs).
Raiciu, C. et al., "Coupled Congestion Control for Multipath Transport Protocols, draft-ietf-mptcp-congestion-02," Mar. 14, 2011, URL: https://tools.ietf.org/html/draft-ietf-mptcp-congestion-02 (12pgs).
Raiciu, C. et al., "Coupled Congestion Control for Multipath Transport Protocols, draft-ietf-mptcp-congestion-01," Jan. 7, 2011, URL: https://tools.ietf.org/html/draft-ietf-mptcp-congestion-01 (12pgs).
Raiciu, C. et al., "Coupled Congestion Control for Multipath Transport Protocols, draft-ietf-mptcp-congestion-00," Jul. 6, 2010, URL: https://tools.ietf.org/html/draft-ietf-mptcp-congestion-00 (11pgs).
A. Ford et al., "TCP Extensions for Multipath Operation with Multiple Addresses, draft-ietf-mptcp-multiaddressed-12," Oct. 22, 2012, URL:https://tools.ietf.org/html/draft-ietf-mptcp-multiaddressed-12 (63pgs).
A. Ford et al., "TCP Extensions for Multipath Operation with Multiple Addresses, draft-ietf-mptcp-multiaddressed-11," Oct. 19, 2012, URL: https://tools.ietf.org/html/draft-ietf-mptcp-multiaddressed-11 (65pgs).
A. Ford et al., "TCP Extensions for Multipath Operation with Multiple Addresses, draft-ietf-mptcp-multiaddressed-10," Oct. 3, 2012, URL: https://tools.ietf.org/html/draft-ietf-mptcp-multiaddressed-10 (64pgs).
A. Ford et al., "TCP Extensions for Multipath Operation with Multiple Addresses, draft-ietf-mptcp-multiaddressed-09," Jun. 6, 2012, URL: https://tools.ietf.org/html/draft-ietf-mptcp-multiaddressed-09 (62pgs).
A. Ford et al., "TCP Extensions for Multipath Operation with Multiple Addresses, draft-ietf-mptcp-multiaddressed-08," May 25, 2012, URL: https://tools.ietf.org/html/draft-ietf-mptcp-multiaddressed-08 (62pgs).
A. Ford et al., "TCP Extensions for Multipath Operation with Multiple Addresses, draft-ietf-mptcp-multiaddressed-07," Mar. 26, 2012, URL: https://tools.ietf.org/html/draft-ietf-mptcp-multiaddressed-07 (62pgs).
A. Ford et al., "TCP Extensions for Multipath Operation with Multiple Addresses, draft-ietf-mptcp-multiaddressed-06," Jan. 31, 2012, URL: https://tools.ietf.org/html/draft-ietf-mptcp-multiaddressed-06 (60pgs).
A. Ford et al., "TCP Extensions for Multipath Operation with Multiple Addresses, draft-ietf-mptcp-multiaddressed-05," Jan. 12, 2012, URL: https://tools.ietf.org/html/draft-ietf-mptcp-multiaddressed-05 (59pgs).
A. Ford et al., "TCP Extensions for Multipath Operation with Multiple Addresses, draft-ietf-mptcp-multiaddressed-04," Jul. 11, 2011, URL:https://tools.ietf.org/html/draft-ietf-mptcp-multiaddressed-04 (59pgs).
A. Ford et al., "TCP Extensions for Multipath Operation with Multiple Addresses, draft-ietf-mptcp-multiaddressed-03," Mar. 14, 2011, URL: https://tools.ietf.org/html/draft-ietf-mptcp-multiaddressed-03 (54pgs).
A. Ford et al., "TCP Extensions for Multipath Operation with Multiple Addresses, draft-ietf-mptcp-multiaddressed-02," Oct. 25, 2010, URL: https://tools.ietf.org/html/draft-ietf-mptcp-multiaddressed-02 (44pgs).
A. Ford et al., "TCP Extensions for Multipath Operation with Multiple Addresses, draft-ietf-mptcp-multiaddressed-01," Jul. 12, 2010, URL: https://tools.ietf.org/html/draft-ietf-mptcp-multiaddressed-01 (43pgs).
A. Ford et al., "TCP Extensions for Multipath Operation with Multiple Addresses, draft-ietf-mptcp-multiaddressed-00," Jun. 21, 2010, URL: https://tools.ietf.org/html/draft-ietf-mptcp-multiaddressed-00 (42pgs).
Scharf, M. et al., "Multipath TCP (MPTCP) Application Interface Considerations, draft-ietf-mptcp-api-07," Jan. 19, 2013, URL: https://tools.ietf.org/html/draft-ietf-mptcp-api-07 (34pgs).
Scharf, M. et al., "Multipath TCP (MPTCP) Application Interface Considerations, draft-ietf-mptcp-api-06," Oct. 22, 2012, URL: https://tools.ietf.org/html/draft-ietf-mptcp-api-06 (30pgs).
Scharf, M. et al., "Multipath TCP (MPTCP) Application Interface Considerations, draft-ietf-mptcp-api-05," Apr. 17, 2012, URL: https://tools.ietf.org/html/draft-ietf-mptcp-api-05 (30pgs).
Scharf, M. et al., "Multipath TCP (MPTCP) Application Interface Considerations, draft-ietf-mptcp-api-04," Feb. 16, 2012, URL: https://tools.ietf.org/html/draft-ietf-mptcp-api-04 (29pgs).
Scharf, M. et al., "Multipath TCP (MPTCP) Application Interface Considerations, draft-ietf-mptcp-api-03," Nov. 30, 2011, URL: https://tools.ietf.org/html/draft-ietf-mptcp-api-03 (28pgs).
Scharf, M. et al., "Multipath TCP (MPTCP) Application Interface Considerations, draft-ietf-mptcp-api-02," Jun. 7, 2011, URL: https://tools.ietf.org/html/draft-ietf-mptcp-api-02 (28pgs).
Scharf, M. et al., "Multipath TCP (MPTCP) Application Interface Considerations, draft-ietf-mptcp-api-01," Mar. 14, 2011, URL: https://tools.ietf.org/html/draft-ietf-mptcp-api-01 (27pgs).
Scharf, M. et al., "Multipath TCP (MPTCP) Application Interface Considerations, draft-ietf-mptcp-api-00," Nov. 29, 2010, URL: https://tools.ietf.org/html/draft-ietf-mptcp-api-00 (26pgs).
IETF 82 Proceedings, "Multipath TCP (mptcp) (WG)," Taipei, Taiwan, Nov. 13-18, 2011, URL: https://www.ietf.org/proceedings/82/mptcp.html (3pgs).
IETF 81 Proceedings, "Multipath TCP (mptcp) (WG)" Quebec, Canada, Jul. 24-29, 2011, URL: https://www.ietf.org/proceedings/81/mptcp.html (3pgs).
Scharf, Michael et al., "draft-ietf-mptcp-api-02" Jul. 27, 2011, URL: https://www.ietf.org/proceedings/81/slides/mptcp-0.pdf (3pgs).
Nishida, Y. et al., "MPTCP—Multipath TCP," WG meeting #7, Jul. 27, 2011, Quebec, IETF-81, URL: https://www.ietf.org/proceedings/81/slides/mptcp-1.pdf (7pgs).
Raiciu, C. et al., "Multipath TCP Congestion Control, draft-ietf-mptcp-congestion-06," URL: https://www.ietf.org/proceedings/81/slides/mptcp-2.pdf (19pgs).
IETF 80 Proceedings, "Multipath TCP (mptcp) (WG)" Prague, Czech Republic, Mar. 27-Apr. 1, 2011, URL: https://www.ietf.org/proceedings/80/mptcp.html (3pgs).
Nishida, Y. et al., "MPTCP—Multipath TCP," WG meeting #6, Mar. 31, 2011, Prague, ietf-80, URL: https://www.ietf.org/proceedings/80/slides/mptcp-0.pdf (7pgs).
Winter, Rolf et al., "Autoconfiguring single-homed end systems to make use of network multi-homing," URL: https://www.ietf.org/proceedings/80/slides/mptcp-1.pdf (8pgs).
Scharf, Michael et al., "draft-ietf-mptcp-api-01," Mar. 31, 2011, URL: https://www.ietf.org/proceedings/80/slides/mptcp-2.pdf (7pgs).
Barre, Sebastien et al., "Multipath TCP—Guidelines for implementers, draft-barre-mptcp-impl-00.txt," IETF 80—Prague, Mar. 31, 2011, URL: https://www.ietf.org/proceedings/80/slides/mptcp-3.pdf (17pgs).
Handley, Mark, "mptcp proxies," URL: https://www.ietf.org/proceedings/80/slides/mptcp-4.pdf (14pgs).
Ford, A. et al., "MPTCP Protocol—Updates, draft-ietf-mptcp-multiaddressed-03," URL: https://www.ietf.org/proceedings/80/slides/mptcp-5.pdf (11pgs).
Scharf, Michael et al., "draft-ietf-mptcp-api-01," URL: https://www.ietf.org/proceedings/80/slides/mptcp-6.pdf (7pgs).
"Mptcp congestion control, draft-ieftf-mptcp-congestion-0?," URL: https://www.ietf.org/proceedings/80/slides/mptcp-9.pdf (4pgs).
Office Action dated Nov. 24, 2017, and English translation thereof, in Chinese Patent Application No. 201180075399.4 (21pgs).
International Search Report and Written Opnion dated Feb. 15, 2012, for International Patent Application No. PCT/US2011/063326, filed Dec. 5, 2011 (11pgs).

(56) References Cited

OTHER PUBLICATIONS

International Search Report and Written Opinion dated Jun. 21, 2012, for International PCT Patent Application No. PCT/US2011/060265, filed Nov. 10, 2011 (14pgs).
International Preliminary Report on Patentability dated May 13, 2014, for International PCT Patent Application No. PCT/US2011/060265, filed Nov. 10, 2011 (11pgs).
International Preliminary Report on Patentability dated Jun. 19, 2014, for International PCT Patent Application No. PCT/US2011/063326, filed Dec. 5, 2011 (6pgs).
Office Action dated Aug. 5, 2015, in Japanese Patent Application No. 2014-545862 (6pgs).
Office Action dated Sep. 28, 2015, in Canadian Patent Application No. 2858162 (5pgs).
Non-Final Office Action dated Jan. 11, 2016, in U.S. Appl. No. 14/356,581, filed May 6, 2016 (25pgs).
Examination Report dated Apr. 20, 2016, in Australian Patent Application No. 2011380909 (4pgs).
Response to Non-Final Office Action dated May 11, 2016, in U.S. Appl. No. 14/356,581, filed May 6, 2014 (17pgs).
English translation of Office Action dated Nov. 9, 2016, in Chinese Patent Application No. 2016110401178750 (4pgs).
Final Office Action dated Nov. 25, 2016, in U.S. Appl. No. 14/356,581, filed May 6, 2014 (18pgs).
Response to Final Office Action filed Feb. 23, 2017, in U.S. Appl. No. 14/356,581, filed May 6, 2014 (18pgs).
Response filed Mar. 24, 2017, in Canadian Patent Application No. 2858162 (22pgs).
Response filed Aug. 15, 2017, and English translation of claims, in Chinese Patent Application No. 201180075399.4 (19pgs).
Response filed Sep. 26, 2017, in Australian Patent Application No. 2016200393 (44pgs).
Office Action dated Aug. 25, 2017, in Canadian Patent Application No. 2,858,162 (4pgs).
Office Action dated Sep. 14, 2017, in Canadian Patent Application No. 2,855,461 (3pgs).
Notice of Acceptance dated Oct. 26, 2017, in Australian Patent Application No. 2016200393 (3pgs).
Non-Final Office Action dated Dec. 29, 2017, in U.S. Appl. No. 14/356,581, filed May 6, 2014 (20pgs).
Response filed Jan. 23, 2018, in Canadian Patent Application No. 2,858,162 (19pgs).
Examination Report dated Jan. 22, 2015, in Australian Patent Application No. 2011382612 (3pgs).
Office Action dated Feb. 21, 2017, in Australian Patent Application No. 2016200393 (5pgs).
Bees, Duncan, "Flexible Bandwidth Services with DSL Bonding," Internet citation, Aug. 1, 2002, XP002495657, Retrieved from the Internet: URL: http://www.pmc-sierra.com/cgi-bin/document.pl?docnum=2021395 (24pgs).
Response filed Mar. 14, 2018, in Canadian Patent Application No. 2,855,461 (3pgs).
Response filed Feb. 9, 2018, and English translation of claims, in Chinese Patent Application No. 201180075399.4 (20pgs).
Office Action dated May 31, 2018, and English translation thereof, in Chinese Patent Application No. 201180075399.4 (22pgs).
Preliminary Amendments made Apr. 12, 2018, in Australian Patent Application No. 2018200888 (32pgs).
Notice of Allowance dated Mar. 9, 2018, in European Patent Application No. 118028265 (7pgs).
Office Action dated Feb. 10, 2017, in Australian Patent Application No. 2016200291 (4pgs).
Response filed May 24, 2017, in Australian Patent Application No. 2016200291 (36pgs).
Office Action dated Jun. 19, 2017, in Australian Patent Application No. 2016200291 (3pgs).
Preliminary Amendment filed Apr. 11, 2018, in Australian Patent Application No. 2018200787 (32pgs).
Office Action dated Aug. 20, 2015, in Canadian Patent Application No. 2,858,030 (3pgs).

English translation of Office Action dated Aug. 21, 2015, in Japanese Patent Application No. 2014545863 (5pgs).
International Search Report and Written Opinion dated Aug. 6, 2012, in International Patent Application No. PCT/US2011/063327 (12pgs).
International Preliminary Report on Patentability dated Jun. 10, 2014, in International Patent Application No. PCT/US2011/063327 (9pgs).
Office Action dated Jan. 19, 2015, in Australian Patent Application No. 2011382613 (3pgs).
Office Action dated Aug. 20, 2015, in Canadian Patent Application No. 2858030 (2pgs).
English translation of Office Action dated Jul. 28, 2015, in Japanese Patent Application No. 2014545863 (5pgs).
First Office Action dated Feb. 10, 2017, in Australian Patent Application No. 2016200291 (4pgs).
Second Office Action dated Jun. 19, 2017, in Australian Patent Application No. 2016200291 (3pgs).
Response filed Oct. 17, 2017, in Australian Patent Application No. 2016200291 (28pgs).
Notice of Acceptance dated Oct. 20, 2017, in Australian Patent Application No. 2016200291 (3pgs).
Notice of Allowance dated Oct. 30, 2017, in European Patent Application No. 11797097.0 (7pgs).
Office Action, and English translation thereof, dated Nov. 1, 2018, in Chinese Patent Application No. 201180075399.4 (20pgs).
Office Action dated Dec. 7, 2018, in European Patent Application No. 11787994.0 (4pgs).
Extended European Search Report dated Mar. 22, 2019, in European Patent Application No. 18211162.5 (9pgs).
2013-2014 Cisco Systems, Inc. "IOS NAT Load-Balancing for Two ISP Connections," Feb. 22, 2008, Document ID: 100658, retrieved from the internet: URL: https://www.cisco.com/c/en/us/support/docs/ip/network-address-translation-nat/100658-ios-nat-load-balancing-2isp.pdf, retrieved Mar. 12, 2019 (5pgs).
Office Action dated Mar. 28, 2019, in Australian Patent Application No. 2018200888 (3pgs).
Non-Final Office Action dated Apr. 9, 2019, in U.S. Appl. No. 15/809,823, filed Nov. 10, 2017 (28pgs).
Communication Under Article 94(3) EPC dated Dec. 7, 2018, in European Patent Application No. 11787994.0 (4pgs).
First Office Action for Indian Patent Application No. 4205/CHENP/2014 dated Mar. 22, 2019 (7 pgs).
Response to the First Office Action for Indian Patent Application No. 4205/CHENP/2014 dated Sep. 20, 2019, (9 pgs).
Third Office Action for Canadian Patent Application No. 2,855,461 dated Jul. 30, 2019 (4 pgs).
Response to the Third Office Action for Canadian Patent Application No. 2,855,461 dated August 20, 2019 (6 pgs).
First Office Action for Chinese Patent Application No. 201180075399.4, dated Jun. 11, 2019 (11 pgs).
Response to the First Office Action for Chinese Patent Application No. 201180075399.4, dated Jul. 15, 2019 (11 pgs).
Notice of Allowance for Australian Patent Application No. 2018200787, dated Oct. 21, 2019 (3 pgs).
Exam Report for Australian Patent Application No. 2018200787, dated Oct. 22, 2019 (4 pgs).
Notice of Allowance for the U.S. Appl. No. 15/809,823, dated Aug. 6, 2019 (9 pgs).
Cisco Systems, "IOS NAT Load-Balancing for Two ISP Connections", Document ID: 100658, dated Feb. 22, 2008. Available from the Internet, <URL:https://www.cisco.com/c/en/us/support/docs/ip/network-address-translation-nat/100658-ios-nat-load-balancing-2isp.html>, (5 pgs).
Examination Search Report dated Mar. 10, 2020 in related Canadian Application No. 3,034,504, (3 pgs).
Non-Final Office Action dated May 4, 2020 in related U.S. Appl. No. 15/845,977, (96 pgs).
Examination Report dated Jun. 15, 2020 in related Australian Application No. 2019202408 5 pgs.

* cited by examiner

METHOD, APPARATUS, AND SYSTEM FOR OPTIMIZING PERFORMANCE OF A COMMUNICATION UNIT BY A REMOTE SERVER

CLAIM OF PRIORITY

This application is a U.S. National Phase application under 35 U.S.C. § 371 of International Application No. PCT/US2011/060265, filed Nov. 10, 2011, entitled "METHOD, APPARATUS, AND SYSTEM FOR OPTIMIZING PERFORMANCE OF A COMMUNICATION UNIT BY A REMOTE SERVER" the entire contents of which are incorporated herein by reference.

FIELD OF THE INVENTION

Embodiments of the invention relate generally to the field of communication systems. More particularly, embodiments of the invention relate to method, apparatus, and system for optimizing performance of a communication unit by a remote server.

BACKGROUND

FIG. 1 is an exemplary prior art communication system (CS) 100 with an access point (AP) 101 and one or more wireless stations $102_{1-N}$. The AP 101 exchanges user data with the one or more stations $102_{1-N}$ over wireless channels indicated by the arrows. The characteristics of the wireless channels and noise/interference are not constant and vary rapidly over time. For example, noise and interference levels from nearby noise/interference sources rapidly changes that cause the characteristics of the wireless environment to change. To cope with such rapid changes in the noise and interference levels, the CS 100 adapts transmission strategies to enhance performance of CS 100. One such known strategy is Adaptation Algorithm. The term "Adaptation Algorithm" herein refers to time-varying and environment-change-dependent transmission or control strategies for a CS. The adaptation algorithm is implemented in the AP 101 that adapts the wireless channels and noise/interference for communication with the one or more stations $102_{1-N}$.

For instance, the transmission rate of Institute of Electrical and Electronics Engineer (IEEE) 802.11g standard based WiFi communication system is rapidly adapted between 6 Mbps and 54 Mbps depending on the link quality and the rate selection method (also known as the rate adaptation algorithm) implemented in the WiFi communication system. Such rate adaptation algorithm within the WiFi communication system uses real-time data that are collected by the AP 101 of the WiFi communication system itself as an input to the adaptation algorithm 103, and a rate change in the link occurs when the real-time data meets a pre-defined criteria.

A possible rate adaptation algorithm 103 is to change transmission rate of signals by the AP 101 within the WiFi communication system when the measured RSSI (Received Signal Strength Indication) becomes too large or too small for the current rate in use. Another possible adaptation algorithm 103 is to increase the transmission rate of signals by the AP 101 whenever packets are successfully received by the AP 101 and/or the one or more stations $102_{1-N}$ for M (e.g., 3) times and decrease rate whenever packets are unsuccessfully received for P (e.g., 2) times. While such adaptation algorithms 103 are required for WiFi communication systems to function properly, the rules and thresholds used by the methods are decided by a system designer of the WiFi communication system. Furthermore, a specific adaptation algorithm 103 is included in the firmware and loaded to the WiFi communication system. Hence, the adaption algorithm 103 is static in nature.

Therefore, the actual performance of the rate adaptation algorithm 103 is dependent on the assumptions made by the designer of the WiFi communication system. These assumptions may be static assumptions that do not change over time. The designer's assumptions, however, may be quite different from the actual operational environments and the WiFi communication system 100 may suffer from low performance due to non-ideal design of the static adaptation algorithm 103.

The impact of such differences in the assumptions can be significant in a large-scale deployment where many communication devices, such as AP's, independently operate. In such a deployment, every single communication environment is unique and the best adaptation method for each environment can be quite dependent on its own environment.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

SUMMARY OF THE INVENTION

Figure 1:
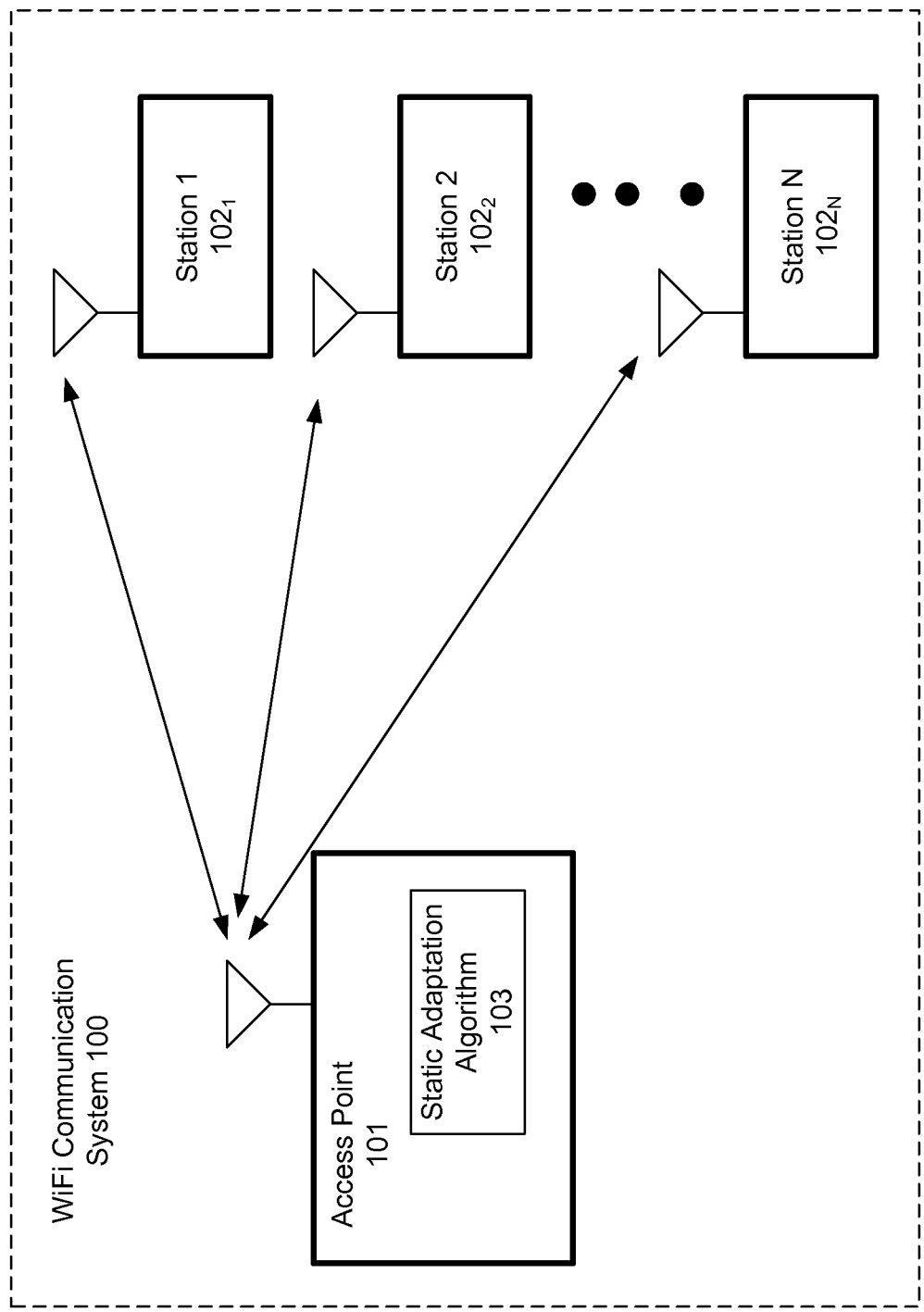
FIG. 1 is a high level system of a typical communication system using a static adaptive algorithm.

The following presents a simplified summary of the embodiments of the invention in order to provide a basic understanding of some aspects of the embodiments. This summary is not an extensive overview of the embodiments of the invention. It is intended to neither identify key or critical elements of the embodiments nor delineate the scope of the embodiments. Its sole purpose is to present some concepts of the embodiments of the invention in a simplified form as a prelude to the more detailed description that is presented later.

Embodiments of the invention relate to method, apparatus, and system for optimizing performance of a communication unit by a remote server. In one embodiment, the method for optimizing performance of one or more communication units by a remote server, comprises: collecting data from the one or more communication units; generating a policy, for each of the one or more communication units, based on the collected data; and sending the policy to each of the one or more communication units, wherein the policy comprises conditions for operation of the one or more communication units, wherein the one or more communication units implement the policy according to time-varying data.

In one embodiment, the system includes a machine-readable storage medium having computer executable instructions stored thereon that when executed cause a processor of a remote server to perform the method for optimizing performance of one or more communication units by the remote server.

In one embodiment, the communications system comprises a WiFi Access Point or a Digital Subscriber Line Access Multiplexer (DSLAM) to perform a method for optimizing performance of one or more communication units coupled to the WiFi Access Point or the DSLAM. In one such embodiment, the method comprises: sending data from one or more communication units to a remote server; receiving a policy from the remote server, wherein the policy comprises conditions for operation of the one or more communication units; and executing the policy by implementing one of first and second algorithms based on the conditions and time-varying data.

In one embodiment, the system includes a machine-readable storage medium having computer executable instructions stored thereon that, when executed, cause a processor, of the WiFi Access Point or the DSLAM, to perform the method for optimizing performance of one or more communication units discussed above.

In one embodiment, the apparatus comprises: a memory; and a processor, coupled to the memory, and operable to: analyze data from one or more communication units; generate a policy, for each of the one or more communication units, based on the collected data; and send the policy to each of the one or more communication units, wherein the policy comprises conditions for operation of the one or more communication units, wherein the one or more communication units implement the policy according to time-varying data.

In one embodiment, the system comprises: one or more communication units; and a server operable to communicate with the one or more communication units, wherein the server comprises: a memory; and a processor, coupled to the memory, and operable to: analyze data from the one or more communication units; generate a policy, for each of the one or more communication units, based on the collected data; and send the policy to each of the one or more communication units, wherein the policy comprises conditions for operation of the one or more communication units, wherein the one or more communication units implement the policy according to time-varying data.

In one embodiment, the communication unit comprises: a transmitter to send data to a remote server; a receiver to receive a policy from the remote server, wherein the policy comprises conditions for operation of the communication unit; and a processor to execute the policy by implementing one of first and second algorithms based on the conditions and time-varying data.

The embodiments of the invention are not limited to DSL or WiFi communication systems of the examples and embodiments above, but apply to any communication system that needs to run/execute adaptation algorithms (also called algorithms) to cope with real-time variations in link channel, noise, interference, and other factors that affect the communication performance. The policy generated by the remote server can be a result of analyzing hundreds (or even millions) of similarly situated communication units, or any other expert knowledge made available to the remote server. Generally, a communication unit does not have the processing power, storage space, or access to large amounts of data to generate the best policy to achieve optimal performance efficiency. Furthermore, a communication unit typically does not have access to historical data related to communications with other stations. Additionally, communication units may lose history data when there is power outage or user-initiated power cycling. The remote server resolves the above problems and provides an optimum policy for the communication units to use that can be based on analysis of a large amount of operational data of the communication units and other similarly situated communication units or any other expert knowledge.

While the summary of the invention has been described in conjunction with specific embodiments thereof, many alternatives, modifications and variations of such embodiments will be apparent to those of ordinary skill in the art in light of the following description. The embodiments of the invention are intended to embrace all such alternatives, modifications, and variations as to fall within the broad scope of the appended claims.

The following description and the annexed drawings set forth in detail certain illustrative aspects of the embodiments of the invention. These aspects, however, are only indicative of the various ways in which the principles of the embodiments of the invention may be employed. The embodiments of the invention are intended to embrace all equivalents in the form of alternatives, modifications, and variations that fall within the broad scope of the appended claims. Other advantages and novel features of the embodiments of the invention will become apparent from the following detailed description of the embodiments of the invention when considered in conjunction with the drawings.

DETAILED DESCRIPTION

Embodiments of the invention relate to method, apparatus, and system for optimizing performance of a communication unit by a remote server. As mentioned in the background section, the actual performance of the communication unit could be dependent on the assumptions made by the designer of the communication system. In one example, as provided in the background section, the actual performance of the WiFi rate adaptation algorithm is dependent on the assumptions made by the designer of the WiFi communication system. These assumptions may be static assumptions that do not change over time. The designer's assumptions, however, may be quite different from the actual operational environments and a WiFi communication system might suffer from low performance due to non-ideal design of the adaptation algorithm.

To overcome the above problem, the embodiments herein describe a method, system and apparatus that analyzes real-time and history of operational data related to a communication system and provides rules and conditions for the communication system to improve its performance. The rules and conditions specify the characteristics of the real-time and historical operational data such that the communication unit can select and use the most desired adaptation algorithm to use. In one embodiment, a remote server (also called an optimization center) is operable to collect and process large amounts of data related to the communication system and determine rules and conditions for the communication system that will improve the performance of the communication system. In one embodiment, the remote server collects data periodically and provides updated rules and conditions periodically for the communication system to adapt so that it may improve its performance. The embodiments herein are not limited to a communication system but can be used for any type of communication system that needs to be updated over time to improve its performance to changing environments.

The term "performance" herein refers to a combination of factors including data rate, throughput, power consumption, power, error rate, latency, jitter, etc. Improving performance of the communication system includes increasing data rate, throughput, reducing error rate and latency, improving jitter, power consumption, etc for the communicating system.

The technical effect of the embodiments discussed herein is the improvement of performance of a communication system (e.g., WiFi, Digital Subscriber Line (DSL), etc) by providing the communication system with rules and conditions that were previously not conceivable by the communication system due to lack of information and processing power needed to generate the rules and conditions. In one embodiment, a dedicated server (also referred as "remote server" or "optimization center") may be used to collect operational data related to the communication system, where the operational data may not be accessible or storable by the communication system itself (e.g., data from other communication units or old data that cannot be stored due to memory limitations) process the operational data and provide rules and conditions that when adapted by the communication system causes the performance of the communication system to improve.

For example, the remote server is operable to perform a statistical analysis of hundreds (or even millions) of communication systems working in a similar environment as the communication system of interest. In one embodiment, the remote server is operable to indicate to the communication system of interest how it can improve its overall performance, for example, by aggressively choosing higher transmission rates as opposed to conservatively choosing lower transmission rates.

In one embodiment, when the WiFi communication system has the capability to decode and execute a pre-defined pseudo-code, the remote server can consider many more algorithms that are known to it and send the rules and/or conditions for the algorithm to be used by communication units. For example, the remote server develops a pseudo-code for the communication unit to execute so that it may improve its communication performance. In one embodiment, the pseudo-code is stored in the memory of the communication unit, example memory of an Access Point. The pseudo-code may be coded in any software coding language that is executable by the communication unit, example by a processor of the Access Point. In one embodiment, as the remote server becomes aware of newer and better algorithms, it enforces some of the communication systems to use one of them by sending a proper pseudo-code to the communication units of the communication system.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Figure 2:
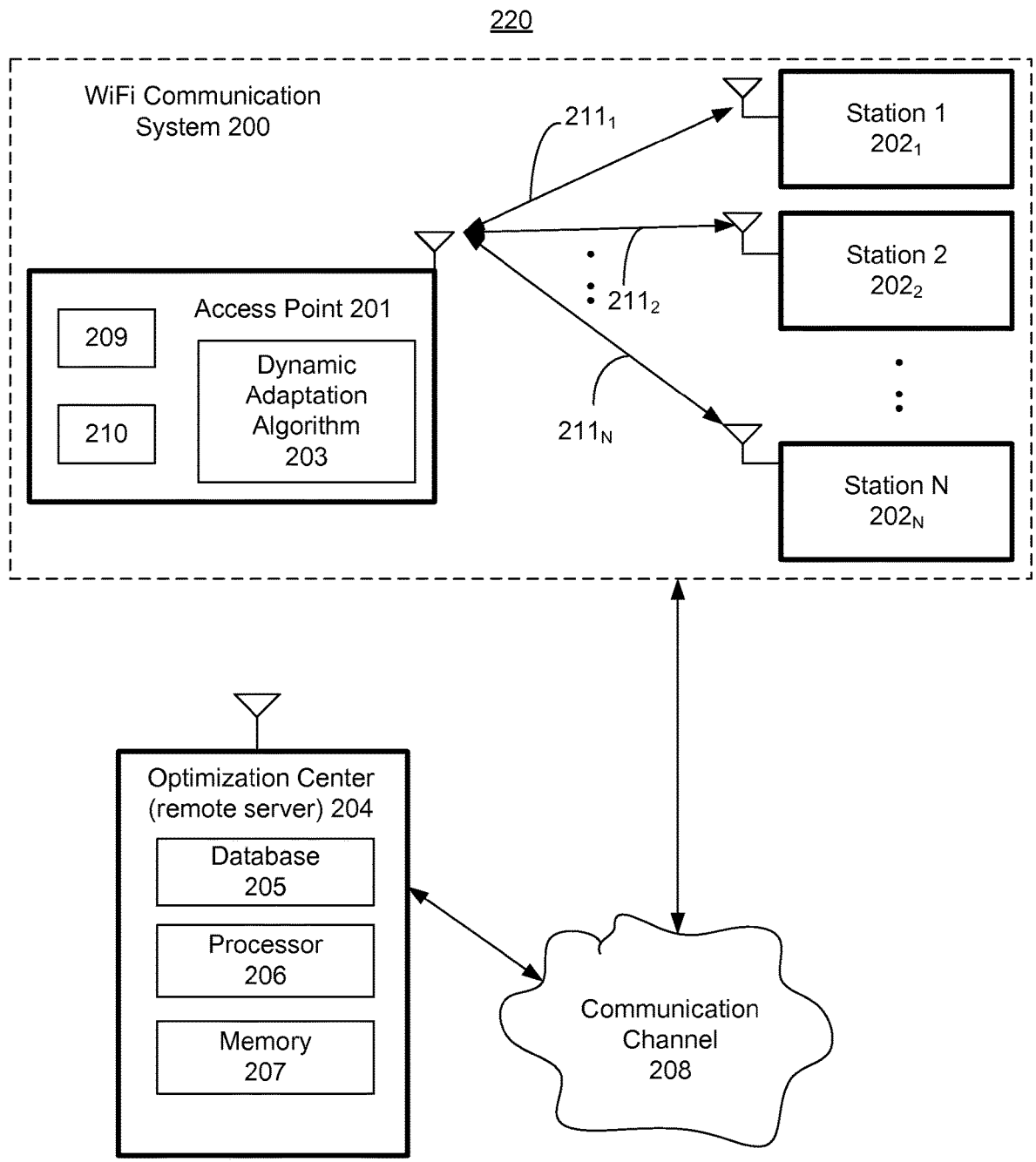
FIG. 2 is a system for optimizing performance of a WiFi communication system by a remote server, according to one embodiment of the invention.

FIG. 2 is a system 220 for optimizing performance of a WiFi communication system 200 by a remote server 204, according to one embodiment of the invention. In one embodiment, the communication system 200 is similar to the communication system of FIG. 1, but is operable to communicate with the remote server 204 (interchangeably referred to as an optimization center). In one embodiment, the WiFi communication system 200 includes an Access Point (AP) 201 which comprises a processor 209, memory 210, and an adaptation algorithm 203 (which may be stored in the memory 210). In one embodiment, the AP 201 is operable to communicate with one or more stations $202_{1-N}$, where N is an integer equal to or greater than 1, by WiFi signals $211_{1-N}$. The term "adaptation algorithm" is interchangeably referred to as "algorithm."

While the embodiment of FIG. 2 illustrates a WiFi communication system 200 with a single AP 201, multiple APs may be used in the WiFi communication system 200 which are operable to communicate with the remote server 204 via the Communication Channel 208. In the embodiments discussed herein the remote server 204 is not part of the communication system 200. In such an embodiment, the communication channel may be one of: the Internet, a TR-069 (Technical Report 069) compatible communications protocol; a Transmission Control Protocol/Internet Protocol (TCP/IP) communications protocol; a Simple Network Management Protocol (SNMP) communications protocol; an out-of-band telephone line protocol; a Digital Subscriber Line Ethernet over Coax (DSL EOC) communications protocol; a cable control channel communications protocol; a powerline control channel communications protocol; a Command Line protocol (CLI); via a wireless device; or via a mobile device.

In one embodiment, the logic unit representing AP 201 and/or the stations $202_{1-N}$ can be at least one of the following communication units: a base station; a wireless Local Area Network (LAN) device; a DSLAM; a gateway; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the remote server 204 is operable to communicate with the AP 201 and/or with any or all of the stations $202_{1-N}$ via the communication Channel 208. In one embodiment the remote server 204 is a cloud server. In one embodiment, the remote server 204 comprises a processor 206, which may be one or more processors, a memory 207 for storing processor executable instructions, and a database 205 to manage data related to the communication system 200.

In one embodiment, the remote server 204 performs a method for optimizing performance of one or more communication units including the AP 201 and the stations $202_{1-N}$. In one embodiment, the remote server 204 is operable to collect data from the one or more communication units (AP 201 and/or the stations $202_{1-N}$). In one embodiment, the remote server 204 periodically collects data from the one or more communication units. The term "periodically" herein refers to regular intervals e.g., once a day, morning and evening of every day, etc.

In one embodiment, the remote server 204 is operable to generate a policy, for each of the one or more communication units (AP 201 and/or the stations $202_{1-N}$) based on the collected data. In one embodiment, the remote server 204 is operable to transmit/send the policy to each of the one or more communication units (AP 201 and/or the stations $202_{1-N}$). The policy generated by the remote server 204 is a result of analyzing hundreds (or even millions) of similarly situated communication units. Generally, an AP does not have the processing power, storage space, or access to large amounts of data to generate the best policy to achieve optimal performance efficiency. Furthermore, an AP does not have access to historical data related to communication with other stations. Additionally, APs may lose data when there is power outage or user-initiated power cycling. The remove server 204 resolves the above problems and provides an optimum policy for the AP 201 to use based on analysis of large amount of operational data of the communication system 200 and other similarly situated communication systems.

Examples of similarly situated communication systems include communications systems having similar communication units. For example, an AP with same power, speed, and brand, and operating with similar (i.e., within 10%) number of stations. Similarly situated communication systems also include communications systems in different geographical areas.

In one embodiment, the remote server 204 transmits/sends the policy to each of the one or more communication units (AP 201 and/or the stations $202_{1-N}$) periodically. For example, the remote server 204 may transmit/send the policy to each of the one or more communication units (AP 201 and/or the stations $202_{1-N}$) when the bandwidth usage of the AP 201 is low (e.g., the AP 201 is operating less than 50% of its capacity to serve communication units) so that it may implement the new policy sent by the remote server 204.

In one embodiment, the policy comprises rules and/or conditions for operation of the one or more communication units (AP 201 and/or the stations $202_{1-N}$). For example, the policy comprises first and second algorithms for adapting the AP 201 to improve its performance. In one embodiment, the one or more communication units (AP 201 and/or the stations $202_{1-N}$) implement the policy according to time-varying data. In one embodiment, the time-varying data comprises location information, current time, and operational data of the one or more communication units (AP 201 and/or the stations $202_{1-N}$). In one embodiment, the location information is determined from a Global Positioning System (GPS) device or setup. The embodiments herein are not limited to two algorithms, but any number of algorithms may be used.

In one embodiment, the communication unit (AP 201 and/or the stations $202_{1-N}$) comprises a transmitter to send data to the remote server 204; a receiver to receive a policy from the remote server 204; and a processor to execute the policy by implementing one of first and second algorithms based on the conditions and time-varying data. The communication units generally do not have the capability in terms of processing resources, access to historical operational data, access to operational data of other similarly situated communication units, etc. Therefore, the prior art communication units cannot use such information for improving their performance. The transmitter discussed above provides data to a central location, i.e. the remote server 204, that has the capability in terms of processing resources, access to historical operational data, access to operational data of other similarly situated communication units, etc, so that it may use such information generate rules and conditions for operating the communication units with enhanced performance. These rules and conditions were previously not conceivable by the communication system (e.g., communication system of FIG. 1) due to lack of information and processing power needed to generate the rules and conditions. The remote server 204, after computing the rules and conditions, provides the rules and conditions to the processors of the communication units, wherein the processors executes their respective policies by implementing one of first and second algorithms based on the rules and/or conditions and time-varying data.

In one embodiment, the one or more communication units (AP 201 and/or the stations $202_{1-N}$) are operable to receive the policy along with one of the first and second algorithms based on the conditions and/or the time-varying data, wherein the first and second algorithms did not exist in the one or more communication units (AP 201 and/or the stations $202_{1-N}$) prior to being provided by the remove server 204. In such an embodiment, the remote server 204 installs a new algorithm 203 in the AP 201, where the new algorithm is executed by the processor 209 of the AP 201.

In one embodiment, the one or more communication units (AP 201 and/or the stations $202_{1-N}$) are operable to receive the policy and implement one of first and second algorithms based on the rule and/or conditions and/or the time-varying data, wherein the first and second algorithms previously existed in the one or more communication units (AP 201 and/or the stations $202_{1-N}$). In such an embodiment, the remote server provides recommendations to the communication units (AP 201 and/or the stations $202_{1-N}$) to use either the first or second algorithm so the communication system 200 may improve its performance.

The conditions may include at least one of: choice of selecting one of the first or second algorithms based on current SNIR (Signal to Noise and Interference Ratio); choice of selecting one of the first or second algorithms based on current time; choice of selecting one of the first or second algorithms based on operational data of the one or more communication units; and choice of selecting one of the first or second algorithms based on location information. In other embodiments, other conditions may be used in conjunction or absence to the above listed conditions. The rules may include equations, when executed in the algorithms, will change how the conditions are evaluated by the algorithms.

In one embodiment, the remote server 204 generates the policy by performing analysis on the collected data, wherein the collected data comprises operational information and historical data about each of the one or more communication units. In one embodiment, the remote server 204 applies the analysis to generate conditions for when to implement one of the first and second algorithms. In one embodiment, the remote server 204 generates the policy by generating a pseudo-code or code for an adaption algorithm to be executed on the one or more communication units (AP 201 and/or the stations 202$_{1-N}$).

In one embodiment, the first algorithm comprises: monitoring received signal strength indication (RSSI); and adapting a data rate according to a mapping of the RSSI from a lookup table. In one embodiment, the second algorithm comprises: counting a first number of consecutive successful transmissions from the one or more communication units to other communication units; counting a second number of consecutive failed transmissions from the one or more communication units to other communication units; adjusting a data rate when the first number exceeds a first threshold; and adjusting the transfer rate when the second number exceeds a second threshold. In other embodiments, other algorithms may be used for first and second algorithms.

The following is an exemplary embodiment showing the process of determining an optimum algorithm by the remote server 204. In one embodiment, the remote server 204 selects one of the first or second algorithms for the communication units (AP 201 and/or the stations 202$_{1-N}$) to achieve optimal performance efficiency for the communication system 200. In one embodiment, first algorithm determines data transmission rates for the communication units based on RSSI while the second algorithm determines data transmission rates based on a number of consecutive successful transmissions and on a number of consecutive failed transmissions. As mentioned above, in one embodiment, the communication units (AP 201 and/or the stations 202$_{1-N}$) have the first and second algorithms previously stored, but do not know which algorithm is more efficiency for the communication system 200. In such an embodiment, the remote server 204 provides recommendations to the communication units about which algorithm to use.

In one embodiment, in the first algorithm the communication units (AP 201 and/or the stations 202$_{1-N}$) monitor the RSSI in real-time and adapts their transmission rates according to the instantaneous RSSI value using a mapping table (Table 1) as shown below.

TABLE 1

| RSSI to rate mapping for first algorithm | |
|---|---|
| RSSI value | Rate |
| −92 dBm or below | 6 Mbps |
| −92 dBm~−90 dBm | 9 Mbps |
| −90 dBm~−88 dBm | 12 Mbps |
| −88 dBm~−86 dBm | 18 Mbps |
| −86 dBm~−84 dBm | 24 Mbps |
| −84 dBm~−82 dBm | 36 Mbps |
| −82 dBm~−80 dBm | 48 Mbps |
| −80 dBm or above | 54 Mbps |

Table 1 is only shown as an example and a person skilled in the art would realize that the communication units may use different rates for different RSSI values other than the ones shown above.

In one embodiment, the second algorithm for the communication units (AP 201 and/or the stations 202$_{1-N}$) uses a higher data rate after K (e.g., 10) consecutive successful transmissions, and uses a lower data rate after M (e.g., 2) consecutive failed transmissions. In one embodiment, the communication units (AP 201 and/or the stations 202$_{1-N}$) provide to the remove server 204 operational data including RSSI, SNR, rate used for transmitting a packet, corresponding result on successful packet delivery, and other relevant data collected in real-time. In one embodiment, communication units (AP 201 and/or the stations 202$_{1-N}$) may accumulate such data within the communication units (AP 201 and/or the stations 202$_{1-N}$) and then send the accumulated data to the remote server 204. In one embodiment, the data transmitted to the remote server 204 is non-real-time data because it is sent after some time (e.g., end of the day).

In one embodiment, the remote server 204 stores such data in its database 205 and performs a full analysis based on all the stored data and any other knowledge available at the remote server 204. In one embodiment, the other knowledge includes similar statistics, as those provided by the communication units (AP 201 and/or the stations 202$_{1-N}$) to the remote server 204, from other similar communication units in other similar geographical localities.

In one embodiment, the remote server 204 determines the presence of intermittent high-power interference from other near-by WiFi systems. When other WiFis' high-power packets collide with the communication system 200's packet, the packet is lost regardless of the rate selection. In one embodiment, the remote server 204 determines that other noise or interference is never observed for the communication system 200, and concludes that it is best to adapt rates for the communication units (AP 201 and/or the stations 202$_{1-N}$) as a function of channel strength, or RSSI, only. In such an embodiment, the remote server 204 sends a control signal to communication units (AP 201 and/or the stations 202$_{1-N}$) asking the communication units (AP 201 and/or the stations 202$_{1-N}$) to use the first algorithm all the time instead of the second algorithm.

In one embodiment, the remote server 204 determines that there is no high-power WiFi interference at all, but channel changes faster than typical static indoor wireless channel (possibly due to people moving around the AP 201). For example, the channel variation tends to be faster between noon and midnight. In such an embodiment, the remote server 204 concludes that it is best to use the second algorithm instead of the first algorithm by the communication units (AP 201 and/or the stations 202$_{1-N}$). In one embodiment, the remote server 204 may determine optimum values for K and M to be used by the communication units (AP 201 and/or the stations $202_{1-N}$) in different times of the day. For example, K=10 and M=1 between noon and midnight; and K=20 and M=2 between midnight and noon.

In one embodiment, the remote server 204 sends a control signal to communication units (AP 201 and/or the stations $202_{1-N}$) asking communication units (AP 201 and/or the stations $202_{1-N}$) to use the second algorithm with the optimized K and M values depending on time in the day. In case the WiFi communication system 200 is not capable of changing the values of K and M as a function of time, the remote server 204 can send two control signals per day, one at noon and another at midnight.

In one embodiment, when the WiFi communication system 200 has the capability to decode and execute a pre-defined pseudo-code, the remote server 204 can consider many more algorithms that are known to it and send the rules and/or conditions for the algorithm to be used by communication units (AP 201 and/or the stations $202_{1-N}$). In one embodiment, the remote server 204 develops a pseudo-code for the communication unit to execute so that it may improve its communication performance. In one embodiment, the pseudo-code is stored in the memory of the communication unit, example memory 210 of the AP 201. The pseudo-code may be coded in any software coding language that is executable by the communication unit, example by the processor 209 of the AP 201. In one embodiment, as the remote server 204 becomes aware of newer and better algorithms, it enforces some of the communication systems to use one of them by sending a proper pseudo-code to the communication units (AP 201 and/or the stations $202_{1-N}$) of the communication system 200.

Figure 3:
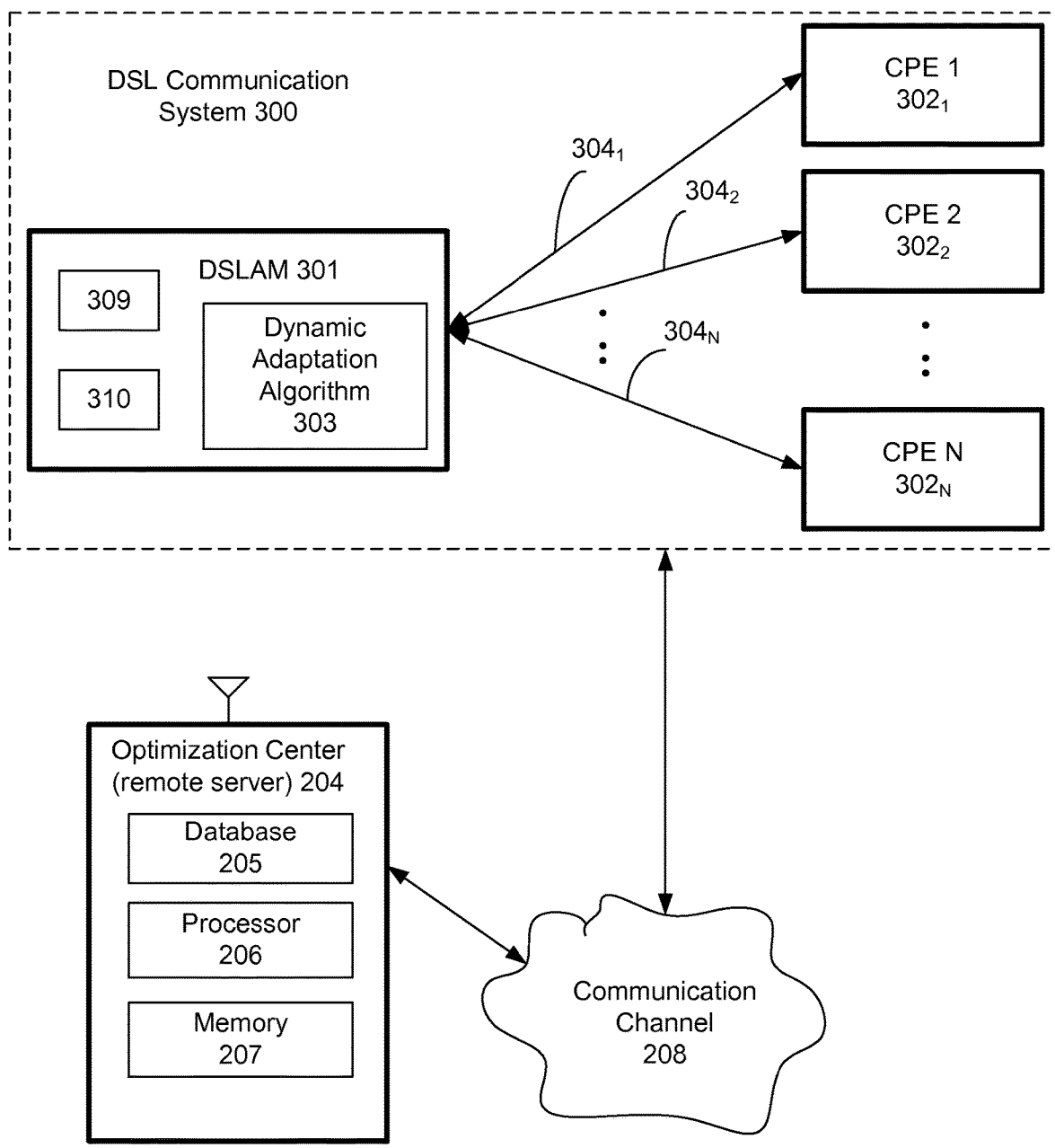
FIG. 3 is a system for optimizing performance of a Digital Subscriber Line (DSL) communication system by a remote server, according to one embodiment of the invention.

FIG. 3 is a system 320 for optimizing performance of a Digital Subscriber Line (DSL) communication system 300 by the remote server 204, according to one embodiment of the invention. The embodiment of FIG. 3 is similar to the embodiment of FIG. 2 in concept, but applicable for DSL systems. The embodiments of the invention are not limited to DSL or WiFi communication systems, but apply to any communication system that needs to run/execute adaptation algorithms (also called algorithms) to cope with real-time variations in link channel, noise, interference, and other factors that affect communication performance.

In one embodiment, the DSL communication system 320 comprises a Digital Subscriber Line Access Multiplexer (DSLAM) 301 that connects to one or more Customer Premises Equipment (CPEs) $302_{1-N}$ by means of DSL signals $304_{1-N}$, where N is an integer equal to or greater than 1. In one embodiment, the remote server 204 performs a method for optimizing performance of the one or more communication units including the DSLAM 301 and the CPEs $302_{1-N}$. In one embodiment, the remote server 204 is operable to collect operational data from the one or more communication units (DSLAM 301 and/or the CPE $302_{1-N}$). In one embodiment, the remote server 204 periodically collects operational data from the one or more communication units.

In one embodiment, the operational data collected by the remote server 204 includes at least one of: band preference indication; margin cap mode indication; indication that margin per tone should be kept smaller than the maximum SNR (Signal to Noise Ratio) margin; service priorities pertaining to net data rate; service priorities pertaining to excess margin; service priorities pertaining to excess margin per tone; service priorities pertaining to delay; service priorities pertaining to impulse noise protection; indication of loading algorithms used with a first DSL system; indication of power allocation algorithms used with the first DSL system; maximum attainable data rate; current data rate; margin; channel attenuation per tone; average attenuation; quiet line noise per tone; active line noise per tone; SNR per tone; transmitted PSD per tone; downstream power back-off shaped parameters (DPBOSHAPED); upstream power back-off shaped parameters (UPBOSHAPED); echo response; band preference; margin cap mode; Forward Error Correction (FEC) count; code violation count; errored seconds; severely errored seconds; number of retraining count; current delay; error distributions; current impulse noise protection; or FEC and interleaving parameters. The above listed operational data is not an exclusive list. More operational data may be used by the remote server 204 to compute rules and/or conditions for the communication units.

In one embodiment, the remote server 204 collects configuration parameters associated with the one or more communication units. The configuration parameters include at least one of: maximum nominal power spectral density (MAXNOMPSD); maximum nominal aggregate transmit power (MAXNOMATP); power cutback (PCB); DPBOSHAPED; UPBOSHAPED; fine gains; gi; transmit spectral scaling factors; tssi; power spectral density mask (PSDMASK); power spectral density level; maximum received power (MAXRXPWR); upstream power "back-off" parameters (UPBOKLE); margin cap mode; carrier mask (CARMASK); minimum impulse noise protection (MININP); maximum delay (MAXDELAY); target margin (TARSNRM); minimum SNR margin (MINSNRM); maximum SNR margin (MAXSNRM); band preference indication (PREFBAND); target data rate; minimum data rate; maximum data rate; FEC and interleaving parameters; per tone bit cap (BCAP[n]); per tone target margin (TARSNRM[n]); reference noise (REFNOISE). The above listed configuration parameters is not an exclusive list. More configuration parameters may be used by the remote server 204 to compute rules and/or conditions for the communication units.

As discussed with reference to FIG. 2, the remote server 204 of FIG. 3 is operable to generate a policy, for each of the one or more communication units (DSLAM 301 and/or the stations $302_{1-N}$), based on the collected operational data, according to one embodiment. In one embodiment, the remote server 204 is operable to transmit/send the policy to each of the one or more communication units (DSLAM 301 and/or the CPE $302_{1-N}$). The policy generated by the remote server 204 is a result of analyzing hundreds (or even millions) of similarly situated communication units. The DSLAM 301 does not have the processing power, storage space, or access to large amounts of data to generate the best policy to achieve optimal performance efficiency. Furthermore, DSLAM 301 does not have access to historical data related to communication with other CPEs connected to other DSLAMs. Additionally, DSLAM 301 may loose data when there is power outage or user-initiated power cycling. The remote server 204 resolves the above problems and provides an optimum policy for the DSLAM 301 to use based on analysis of large amount of operational data of the communication system 300 and other similarly situated communication systems. The optimum policy can be determined based on expert knowledge outside of the communication system where the expert knowledge can be obtained from lab testing, simulation or any other research methods. The policy can be adaptively modified even after the full deployment of the communication system, and hence does not suffer from limited knowledge that is used at the time of manufacturing the communication system. In the embodiments discussed herein the remote server 204 is not part of the communication system 300.

In one embodiment, when the DSL communication system 300 has the capability to decode and execute a predefined pseudo-code, the remote server 204 can consider many more algorithms that are known to it and send the rules and/or conditions for the algorithm to be used by communication units (DSLAM 301 and/or the CPEs $302_{1-N}$). In one embodiment, the remote server 204 develops a pseudo-code for the communication unit to execute so that it may improve its communication performance. In one embodiment, the pseudo-code is stored in the memory of the communication unit, example memory 310 of the DSLAM 301. The pseudo-code may be coded in any software coding language that is executable by the communication unit, example by the processor 309 of the DSLAM 301. In one embodiment, as the remote server 204 becomes aware of newer and better algorithms, it enforces some of the communication units to use one or more of them by sending a proper pseudo-code to the communication units (DSLAM 301 and/or the CPEs $302_{1-N}$) of the communication system 300.

Following is an exemplary embodiment of how the remote server 204 can improve the performance of a DSL system. In DSL systems, for example the system 300, downstream (DS) margin is an important line performance metric that can be monitored by CPEs $302_{1-N}$ in real-time. In general, a higher margin indicates an exponentially smaller chance of errors for the delivery of video or data packets over DSL links $304_{1-N}$. When the margin becomes very small, typically below 0 dB, the link will experience errors that can cause serious impacts on packet delivery to the CPEs $302_{1-N}$. To prevent continuation of such an unreliable link quality over a long time, CPEs $302_{1-N}$ can initiate a retraining procedure and improve the operation conditions. The retraining procedure may take 20 to 60 seconds. In one embodiment, the above feature of DSL systems is implemented by CPEs $302_{1-N}$ monitoring DS margins and initializing a retraining process when the margin becomes below a pre-configured threshold value 'T.' Conventionally, 'T' is set to 0 dB and controlled via the DSL line's profile.

The remote server 204 may collect operational and performance data of the DSL system 300, analyze the historical data (operational and performance data) associated with the DSL system 300, and determine the best estimated value of 'T' for each line and applies the value to each line.

The term "line" herein refers to a communication link (wired or wireless) between the DSLAM 301 and the corresponding CPE. The value of 'T' may be analyzed per-line basis by the remote server 204. Different values of 'T' can be applied by the remote server 204 to different DSL lines depending on their historical and environmental characteristics.

Each CPE among the CPEs $302_{1-N}$ applies an algorithm to tune its performance. For example, the CPE applies a rule and/or condition to adapt the value of 'T' in real-time as a function of the real-time data (operational and performance) that is available in the corresponding CPE. The CPEs $302_{1-N}$ are operable to apply the following rules and conditions. If video traffic is observed by the CPE over the line for more than $t_1$ (e.g., 1 minute), then the CPE updates the value of 'T' to '$T_1$' (e.g., 2 dB). Such a rule allows the CPE to react fast on pixelization problems associated with video traffic. In this example, the conditions are the choice of '$t_1$' and '$T_1$', while the rule is the "if, then" equation. Typically each retraining process of the CPE causes discontinuation/interruption of video and data services for a short time (e.g., 10-45 seconds), but such an interruption can be preferable to a persistent pixelization problem of the video traffic for several minutes or more. If no video traffic is observed by the CPE for more than '$t_2$' (e.g., 10 minutes) then the CPE updates the value of 'T' to '$T_2$' (e.g., 0 dB). In this example, the conditions are the choice of '$t_2$' and '$T_2$,' while the rule is the "if, then" equation. This rule allows the CPE to reduce the chance of initiating a retraining process that can interrupt data traffic. Data service is more resilient to errors compared to video traffic, and the errors that can happen for a small margin (e.g., 0-2 dB) are likely tolerable for data traffic.

The above example of the rule and/or condition involves real-time monitoring of the data of the DSL system 300 and real-time adaptation algorithm within the DSL system 300. In some embodiments, the data of the DSL system 300 may not be entirely in real-time but the data update may be frequent enough (e.g., 5 minutes) to behave like real-time data.

In one embodiment, the threshold values '$t_1$,' '$t_2$,' '$T_1$' and '$T_2$' used by the rules/conditions discussed above are not statically kept in the DSL system 300, but optimized by the remote server 204. In one embodiment, the CPE continues to keep its rule/condition, but the parameters of the rules, i.e. the threshold values (conditions) '$t_1$,' '$t_2$,' '$T_1$' and '$T_2$,' are updated in the CPEs $302_{1-N}$ by the remote server 204. In such an embodiment, the remote server 204 collects and analyzes historical operational data and any side information (e.g., data from other similarly situated DSL systems) that is available at the remote server 204.

Continuing with the exemplary embodiment discussed above, the remote server 204 will choose '$T_1$'=0 dB for a DSL line if pixelization has hardly happened even for margins between 0 and 2 dB in the historical operational data, but will choose '$T_1$'=4 dB if pixelization always occurred and continued for several minutes for margins between 0 and 4 B. Such long-term adaptation of the rules by remote server 204 allows the DSL system 300 to perform at its optimum ability under all circumstances. In one embodiment, the switching of modes discussed above happens in real-time or very frequently, but the update of threshold values or rules to be used by the CPEs $302_{1-N}$ happens at a much lower frequency. In one embodiment, the remote server transmits the updated policy (with new threshold values) to the DSL system 300 a once per day.

While the embodiments of FIG. 3 are discussed in terms of margin and video traffic in the DSL system 300, the embodiments can be applied to any DSL or other communication system adaptation algorithm that reacts in real-time to other data parameters without changing the essence of the embodiments of the invention.

Figure 4:
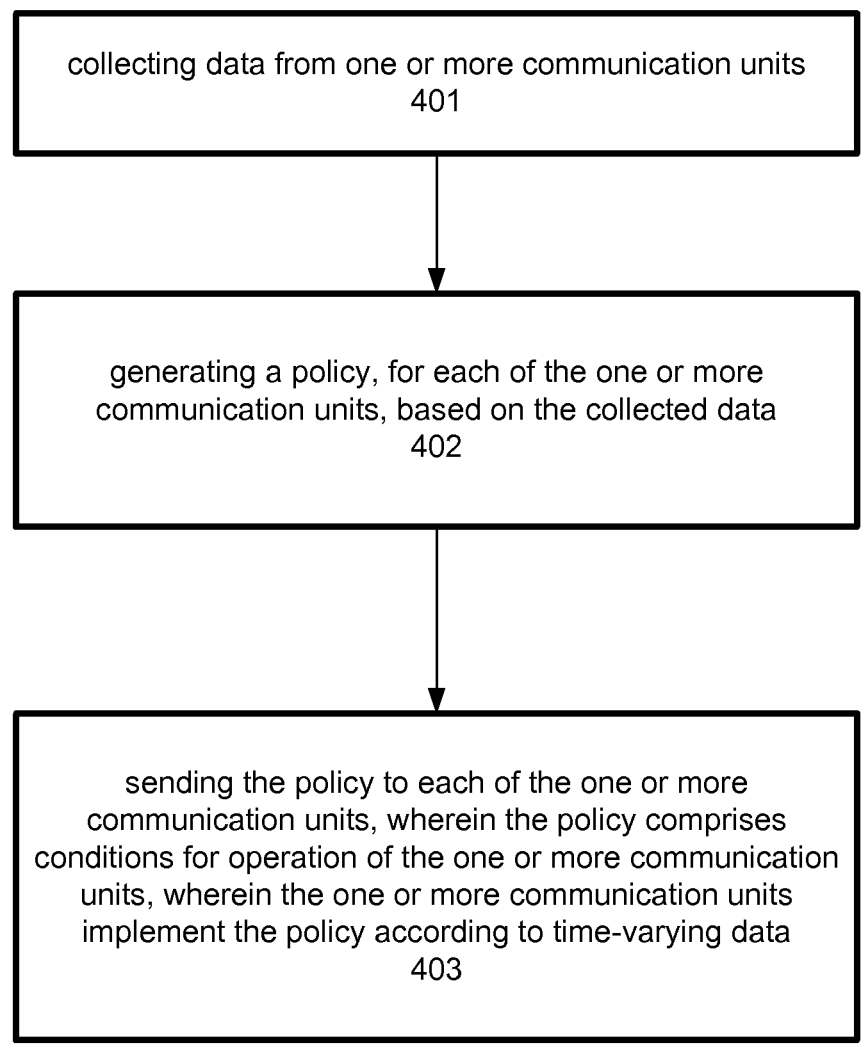
FIG. 4 is a method performed by a remote server for optimizing performance of the communication system by the remote server, according to one embodiment of the invention.

FIG. 4 is a method 400 performed by a remote server for optimizing performance of a communication system, according to one embodiment of the invention. Although the blocks in the flowcharts with reference to FIG. 4 are shown in a particular order, the order of the actions can be modified. Thus, the illustrated embodiments can be performed in a different order, and some actions/blocks may be performed in parallel. The flow chart of FIG. 4 is illustrated with reference to the embodiments of FIGS. 2-3.

At block 401, the remote server 204 collects data (operational and/or performance data) from the one or more communication units. As discussed above, the communication units in FIG. 2 are AP 201 and/or the stations $202_{1-N}$ while communication units in FIG. 3 are DSLAM 301 and/or the CPE $302_{1-N}$. In one embodiment, the communication units are at least one of a base station; a wireless LAN device; a DSLAM; a gateway; a performance enhancement device; a DSL CPE modem; an in-home powerline device;

a HPNA based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; a STB/STU customer electronics device; an IP enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

At block 402, the remote server 204 generates a policy, for each of the one or more communication units based on the collected data. As discussed above, the policy with reference to FIG. 2 comprises first and second algorithms (also called adaptive algorithms). In one embodiment, the first algorithm comprises: monitoring received signal strength indication (RSSI); and adapting a transfer rate according to a mapping of the RSSI from a lookup table. In one embodiment, the second algorithm comprises: counting a first number of consecutive successful transmissions from the one or more communication units to other communication units; counting a second number of consecutive failed transmissions from the one or more communication units to other communication units; adjusting a transfer rate when the first number exceeds a first threshold; and adjusting the transfer rate when the second number exceeds a second threshold. In other embodiments, other algorithms may be used for first and second algorithms.

With reference to FIG. 3, the policy may comprise rules and conditions such as the threshold values '$t_1$,' '$t_2$,' '$T_1$' and '$T_2$' for the DSL system 300 and equations that use these threshold values. Other policies may be used for the above systems of FIGS. 2-3 and for other systems.

At block 403, the remote server 204 sends the policy to each of the one or more communication units, wherein the one or more communication units implement the policy according to time-varying data (data collected by the communication units of the communication systems).

Figure 5:
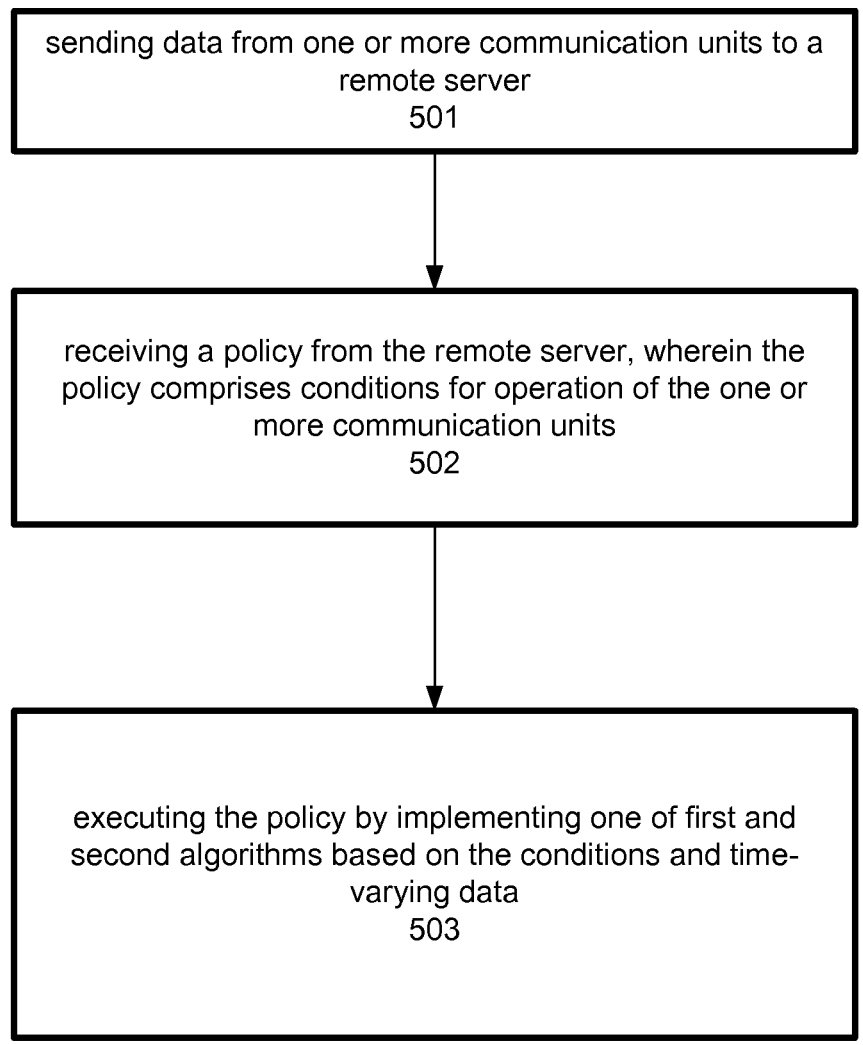
FIG. 5 is a method performed by the communication system for optimizing performance of the communication system by the remote server, according to one embodiment of the invention.

FIG. 5 is a method 500 performed by a communication system for optimizing performance of the communication system by a remote server, according to one embodiment of the invention. Although the blocks in the flowcharts with reference to FIG. 5 are shown in a particular order, the order of the actions can be modified. Thus, the illustrated embodiments can be performed in a different order, and some actions/blocks may be performed in parallel. The flow chart of FIG. 5 is illustrated with reference to the embodiments of FIGS. 2-3. So as to avoid repetitiveness, only the processes performed by the communication units are discussed.

At block 501, the one or more communication units send data to the remote server 204. The data may be operational data, performance data, or any other time-varying data. At block 502, the one or more communication units receive a policy generated by the remove server 204, wherein the policy comprises rules and/or conditions for operation of the one or more communication units. At block 503, the one or more communication units execute the policy sent by the remote server 204 to implement an algorithm based on the rules and/or conditions and time-varying data. As discussed above, the policy with reference to FIG. 2 comprises first and second algorithms (also called adaptive algorithms). In one embodiment, the first algorithm comprises: monitoring received signal strength indication (RSSI); and adapting a transfer rate according to a mapping of the RSSI from a lookup table. In one embodiment, the second algorithm comprises: counting a first number of consecutive successful transmissions from the one or more communication units to other communication units; counting a second number of consecutive failed transmissions from the one or more communication units to other communication units; adjusting a transfer rate when the first number exceeds a first threshold; and adjusting the transfer rate when the second number exceeds a second threshold. In other embodiments, other algorithms may be used for first and second algorithms. With reference to FIG. 3, the policy may comprise rules and conditions such as the threshold values $t_1$, $t_2$, $T_1$ and $T_2$ for the DSL system 300. Other policies may be used for the above systems of FIGS. 2-3 and for other systems.

Figure 6:
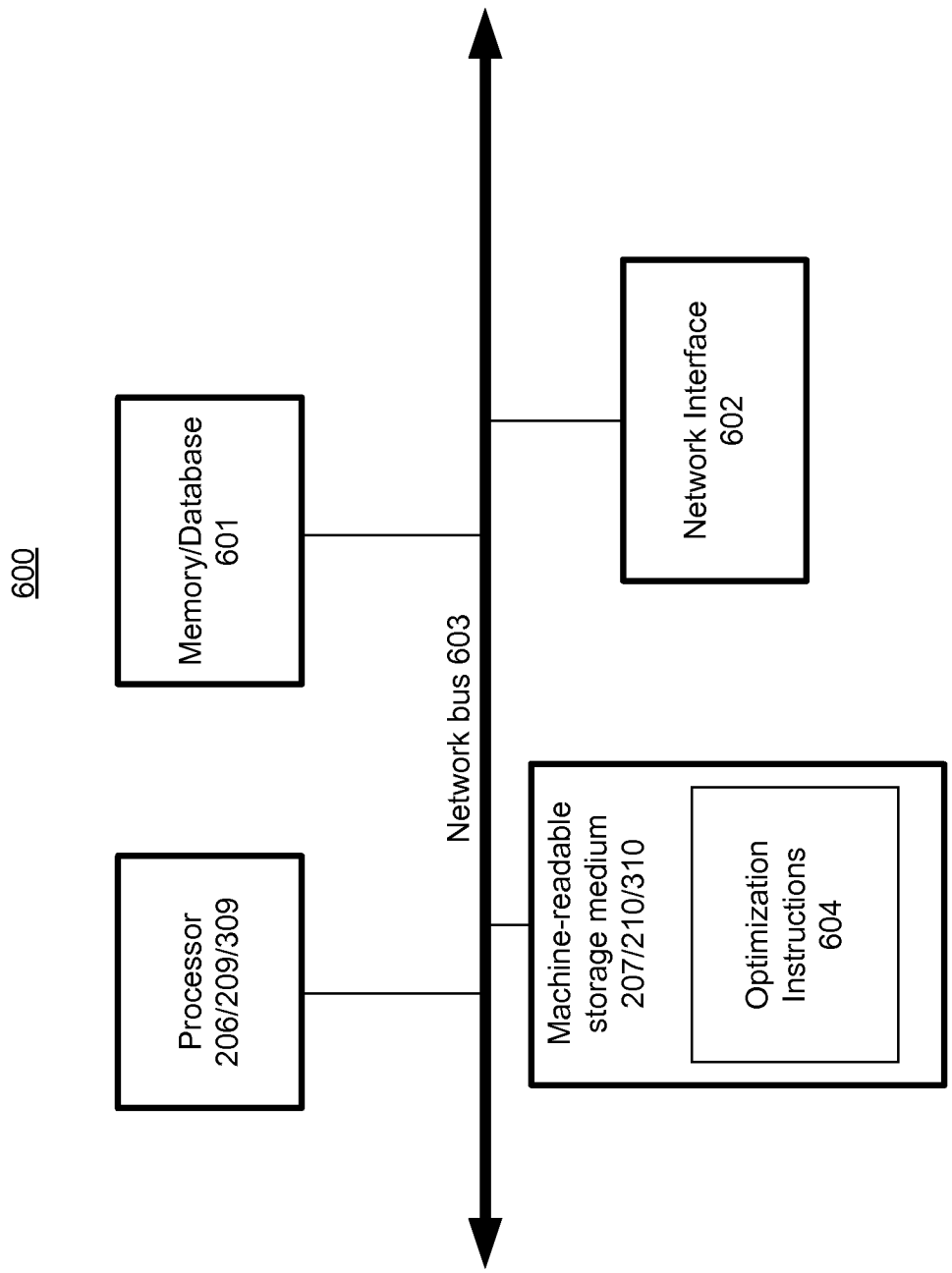
FIG. 6 is a processor-based system having machine-readable storage medium with computer executable instructions for optimizing performance of the communication system by the remote server, according to one embodiment of the invention.

FIG. 6 is a processor-based system 600 having machine-readable storage medium with computer executable instructions 604 for optimizing performance of the communication system by a remote server, according to one embodiment of the invention. Machine-readable storage medium is one of 207, 210, or 310 (collectively referred to as "207/201/310"). The computer/machine-readable/executable instructions are executed by a processor (e.g., processor 206 of the remote server, or processors 209 and 309 of the AP 201 or DSLAM 301 respectively). Elements of embodiments are also provided as a machine-readable medium for storing the computer-executable instructions (e.g., instructions to implement the flowcharts of FIGS. 4-5 and other processes discussed in the description).

In one embodiment, the processor-based system 600 further comprises a database 601 to store data used by the instructions 604. In one embodiment, the processor-based system includes a network interface 602 to communicate with other devices. In one embodiment, the components of the processor-based system 600 communicate with one another via a network bus 603.

The machine-readable storage medium 207/210/310 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description.

For example, the embodiments discussed above can apply to a communication system comprising a performance enhancement device. A performance enhancement device may comprise a signal conditioning device, a diagnostic and remedy guidance device, or a noise cancellation device. A noise cancellation device, among other things, acts to cancel noise and interference present on the DSL line, either autonomously or in conjunction with commands from the remote server. In one embodiment, the performance enhancement device is communicatively coupled to the remote server 204 via the Communication Channel 208. In such an embodiment, impulse noise cancellation feature of the performance enhancement device may be turned on and off based on the real-time observation of noise, and the actual algorithm for deciding on-off can be distributed where long-term thresholds/rules and conditions are calculated by the remote server 204 and transmitted to the performance enhancement device. In one embodiment, the remote server 204 forces the actual transition in the performance enhancement device as a function of real-time observation of the noise data.

Another alternative embodiment related to a WiFi system is described as follows. In a typical WiFi communication system, Carrier Sense Multiple Access (CSMA) protocol is used for multiple access. Due to the nature of wireless channel, some of the stations (clients) might not be able to hear each other while both can reach the AP with strong power. This phenomenon is known as Hidden Node problem. One way to resolve this problem is to schedule the data transmission using Request to Send (RTS) and Clear to Send (CTS) mechanisms. Such a use of RTS/CTS incurs overhead in channel usage, but prevents disastrous packet collisions by the two stations.

In one embodiment, the remote server 204 collects operational and performance data of the WiFi AP 201 (and other APs) and/or stations $202_{1-N}$. In one embodiment, the remote server 204 analyzes the historical data and determines the best value for each AP (on or off) and applies the value to each AP. In one embodiment, the value is analyzed per-AP by the remote server 204, and therefore different values can be applied to different APs depending on their data characteristics.

In one embodiment, each AP is operable to apply a rule with conditions to adapt RTS/CTS on/off in real-time as a function of real-time data available to the local AP. In one embodiment, the rule generated by remote server and made available in the AP is that if a large packet error rate is detected for more than $t_1$ (e.g., 1 minute), the AP turns on RTS/CTS. In one embodiment, the rule generated by remote server and made available in the AP is that if a large packet error rate is not detected for more than $t_2$ (e.g., 10 minutes), then the AP turns off RTS/CTS.

In the above embodiment, two or more operation modes are described in context of a local communication device (e.g., AP) selecting the operation mode to use in real-time. In one embodiment, the selection of the operation mode is a function of the real-time data that is locally available. In other embodiments, the data might not be in real-time but the data update may be frequent enough for this idea to consider the data as real-time.

In one embodiment, the rules and/or conditions e.g., the threshold values '$t_1$', and '$t_2$,' and equations applying them, are not statically kept as in AP, but optimized by the remote server 204. In one embodiment, the threshold values '$t_1$', and '$t_2$,' and/or the equations are updated by the remote server 204 using historical data and any side information that is available at the remote server side. In the above alternative embodiment, RTS/CTS was involved, however, the essence of the embodiments can be applied to any WiFi adaptation algorithm that reacts in real-time to other data parameters. WiFi adaptation algorithms include control of fragmentation, channels, association, etc.

The embodiments of the invention are intended to embrace all such alternatives, modifications, and variations as to fall within the broad scope of the appended claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. A method for improving performance of one or more communication units, the method comprising:
   receiving, by a server, from network monitoring devices that monitor, in real-time, data associated with an operation of two or more communication units located in different geographical areas, the data comprising a parameter;
   processing, by the server, at least one of the data and historical data;
   based on the processed data, determining a policy for at least one of the two or more communication units; and
   in response to the server detecting interference or noise from nearby wireless channels, determining that packets will be lost regardless of rate selection and, otherwise, communicating the policy to at least one or more communication units that implement one or more algorithms that use the parameter and at least a rule or a condition for the one or more communication units to improve a performance of the one or more communication units.

2. The method of claim 1, wherein the data further comprises determining a received signal strength indication.

3. The method of claim 1, further comprising, based on a change in the operation, updating the policy.

4. The method of claim 3, wherein updating the policy comprises updating the parameter.

5. The method of claim 1, wherein determining the policy comprises selecting the policy from a set of policies that are stored on the one or more communication units.

6. The method of claim 1, wherein the one or more communication units comprise at least one of:
   an access point (AP);
   a base station;
   a wireless LAN device;
   a DSLAM;
   a gateway;
   a performance enhancement device;
   a Digital Subscriber Line (DSL) Customer Premises Equipment (CPE) modem;
   an in-home powerline device;
   a Home Phoneline Network Alliance (HPNA) based device;
   an in-home coax distribution device;
   a G.hn (Global Home Networking Standard) compatible device;
   an in-home metering communication device;
   an in-home appliance communicatively interfaced with the LAN;

a wireless femtocell base station;
a wireless WiFi compatible base station;
a wireless mobile device repeater;
a wireless mobile device base station;
a set-top box (STB)/set-top unit (STU) customer electronics device;
an Internet Protocol (IP) enabled television;
an IP enabled media player;
an IP enabled gaming console;
an Ethernet gateway;
a computing device connected to the LAN;
an Ethernet connected computer peripheral device;
an Ethernet connected router;
an Ethernet connected wireless bridge;
an Ethernet connected network bridge; or
an Ethernet connected network switch.

7. The method of claim 1, wherein processing comprises storing at least one of the data and historical data in a memory.

8. The method of claim 1, wherein the data further comprises time-varying data.

9. The method of claim 1, wherein the server performs an analysis of at least one of the data and historical data.

10. The method of claim 9, wherein the analysis comprises a statistical analysis of at least one of the data and historical data.

11. A non-transitory machine-readable storage medium having computer executable instructions stored thereon that when executed cause a processor of a server to perform a method for improving performance of one or more communication units, the method comprising:
receiving from network monitoring devices that monitor, in real-time, data associated with an operation of two or more communication units located in different geographical areas, the data comprising a parameter;
processing at least one of the data and historical data;
determining by the server, a policy for each of the one or more communication units, based on the processed data; and
in response to the server detecting the absence of an interference or noise from nearby wireless channels, determining that packets will be lost regardless of rate selection and, otherwise, communicating the policy to two or more communication units that implement one or more algorithms based on at least a rule or a condition to improve a performance of the one or more communication units.

12. The non-transitory machine-readable storage medium of claim 11, wherein processing comprises storing at least one of the data and the historical data in a memory device.

13. The non-transitory machine-readable storage medium of claim 11, wherein determining the policy comprises determining a condition for communicating the policy.

14. The non-transitory machine-readable storage medium of claim 11, wherein the data further comprises determining a received signal strength.

15. The non-transitory machine-readable storage medium of claim 11, further comprising updating the parameter based on a change in the operation to update the policy.

16. The non-transitory machine-readable storage medium of claim 11, wherein determining the policy comprises selecting the policy from a set of policies.

17. The method of claim 11, wherein the data further comprises time-varying data.

18. The method of claim 11, wherein the server performs an analysis of at least one of the data and historical data.

19. The method of claim 18, wherein the analysis comprises a statistical analysis of at least one of the data and historical data.

20. An apparatus comprising:
a memory; and
a processor, coupled to the memory, and operable to:
receive, from network monitoring devices that monitor, in real-time, data associated with an operation of two or more communication units located in different geographical areas, the data comprising a parameter;
analyze at least one of the data and historical data;
based on the analyzed data, determine a policy for at least one of the two or more communication units; and
in response to a server detecting the absence of an interference or noise from nearby wireless channels, determining that packets will be lost regardless of rate selection and, otherwise, communicate the policy to at least one or more communication units that implement one or more algorithms based on at least a rule or a condition to improve a performance of the one or more communication units.

21. The apparatus of claim 20, wherein the network monitoring devices determine a received signal strength.

22. The apparatus of claim 20, wherein determining the policy comprises selecting the policy from a set of policies and updating the parameter.

23. The apparatus of claim 20, wherein determining the policy comprises determining a condition for communicating the policy.

24. The apparatus of claim 20, wherein the data further comprises time-varying data.

25. The apparatus of claim 20, wherein the server performs an analysis of at least one of the data and historical data.

* * * * *